US012775499B2

(12) United States Patent
Norbutas et al.

(10) Patent No.: US 12,775,499 B2
(45) Date of Patent: Oct. 27, 2026

(54) DYNAMIC SECURITY FILTERING FOR MULTI-PROVIDER AI INFRASTRUCTURES

(71) Applicant: Spectra tech, UAB, Vilnius (LT)

(72) Inventors: Emanuelis Norbutas, Vilnius (LT); Tomas Okmanas, Vilnius (LT); Gediminas Lisauskas, Vilnius (LT)

(73) Assignee: Spectra tech, UAB, Vilnius (LT)

( * ) Notice: Subject to any disclaimer, the term of this patent is extended or adjusted under 35 U.S.C. 154(b) by 0 days.

(21) Appl. No.: 19/373,201

(22) Filed: Oct. 29, 2025

(65) Prior Publication Data

US 2026/0178776 A1 Jun. 25, 2026

Related U.S. Application Data

(60) Provisional application No. 63/736,242, filed on Dec. 19, 2024.

(51) Int. Cl.
*G06F 21/62* (2013.01)
*G06F 21/60* (2013.01)

(52) U.S. Cl.
CPC ........ *G06F 21/6254* (2013.01); *G06F 21/604* (2013.01)

(58) Field of Classification Search
None
See application file for complete search history.

(56) References Cited

U.S. PATENT DOCUMENTS 10,713,143 B1 7/2020 Vemulapati et al.
12,254,279 B1 3/2025 Cohen et al.
12,292,811 B1 5/2025 Deb et al.
12,306,834 B1 5/2025 Ferchau et al.
2018/0365435 A1* 12/2018 Anandam ............ G06F 21/604
2019/0081950 A1* 3/2019 Baracaldo Angel .... H04L 63/10
2019/0362222 A1 11/2019 Chen
2020/0044990 A1* 2/2020 Zhao ........................ G06N 7/00
2020/0394466 A1 12/2020 Jia et al.
2022/0245099 A1* 8/2022 Viswanathan .......... G06F 9/465
2024/0013050 A1 1/2024 Pal et al.
(Continued)

FOREIGN PATENT DOCUMENTS

WO WO-2026016120 A1 * 1/2026 ........... G06F 16/248

OTHER PUBLICATIONS

Unify AI, Build AI Your Way, <https://unify.ai/> Retrieved from Internet Dec. 17, 2024, 8 pages.
(Continued)

*Primary Examiner* — Amir Mehrmanesh
*Assistant Examiner* — Hassan Saadoun
(74) *Attorney, Agent, or Firm* — Young Basile Hanlon & MacFarlane, P.C.

(57) ABSTRACT

A request is received from a client device at an agentic intermediary. A determination is made that the request includes restricted data. The restricted data is replaced with one or more placeholders to generate a sanitized request. The sanitized request is transmitted to an artificial intelligence model for processing. A response that includes the one or more placeholders is received from the artificial intelligence model. The restricted data is restored in place of the one or more placeholders in the response to generate a restored response. The restored response is then transmitted to the client device.

20 Claims, 12 Drawing Sheets

(56) References Cited

U.S. PATENT DOCUMENTS

| | | | | |
|---|---|---|---|---|
| 2024/0037646 | A1* | 2/2024 | Sheikh | G06F 16/275 |
| 2024/0062112 | A1* | 2/2024 | Nezami | G06F 40/295 |
| 2024/0282452 | A1* | 8/2024 | Tyagi | G06N 20/00 |
| 2024/0370339 | A1 | 11/2024 | Statton et al. | |
| 2025/0021844 | A1* | 1/2025 | Zalmanson | G06N 5/046 |
| 2025/0036670 | A1 | 1/2025 | Cheng et al. | |
| 2025/0053391 | A1 | 2/2025 | Upadhyay et al. | |
| 2025/0053876 | A1 | 2/2025 | Upadhyay et al. | |
| 2025/0110976 | A1* | 4/2025 | Channapattan | G06F 16/3329 |
| 2025/0138909 | A1 | 5/2025 | Mahajan et al. | |
| 2025/0258852 | A1 | 8/2025 | Crabtree et al. | |
| 2025/0322175 | A1 | 10/2025 | Richards et al. | |

OTHER PUBLICATIONS

Martian, Higher performance and lower cost than any single LLM, <https://withmartian.com/> Retrieved from Internet Dec. 17, 2024, 6 pages.

NVIDIA AI, <https://www.nvidia.com/en-us/#referrer=octoai/> Retrieved from Internet Dec. 17, 2024, 10 pages.

Anyscale, Anyscale's LLM Suite, <https://www.anyscale.com/product/platform/llm-suite> Retrieved from Internet Dec. 17, 2024, 11 pages.

Aporia, Guardrails pricing, <https://www.aporia.com/pricing/> Retrieved from Internet Dec. 17, 2024, 6 pages.

Aguru, Observe and Master Your LLM Behavior End-to-End, <https://aguru.com/> Retrieved from Internet Dec. 17, 2024, 10 pages.

Together.ai, together.pricing, <https://www.together.ai/pricing> Retrieved from Internet Dec. 17, 2024, 6 pages.

Sentry, LLM Monitoring (Beta), <https://sentry.io/for/llm-monitoring/> Retrieved from Internet Dec. 17, 2024, 6 pages.

Lunary, Take your AI chatbot to the next level, <https://lunary.ai/> Retrieved from Internet Dec. 17, 2024, 11 pages.

LangSmith, Get your LLM app from prototype to production, <https://www.langchain.com/langsmith> Retrieved from Internet Dec. 17, 2024, 20 pages.

Portkey, Control Panel for AI Apps, <https://portkey.ai/> Retrieved from Internet Dec. 17, 2024, 6 pages.

Helicone, Ship your AI app with confidence, <https://www.helicone.ai/> Retrieved from Internet Dec. 17, 2024, 14 pages.

Traceloop, The only way to monitor LLMs, <https://www.traceloop.com/> Retrieved from Internet Dec. 17, 2024, 9 pages.

Github, lm-sys / RouteLLM, <https://github.com/lm-sys/RouteLLM> Retrieved from Internet Dec. 17, 2024, 10 pages.

LiteLLM—Getting Started, <https://docs.litellm.ai/> Retrieved from Internet Dec. 17, 2024, 6 pages.

Github, stanford-futuredata / FrugalGPT, <https://github.com/stanford-futuredata/FrugalGPT> Retrieved from Internet Dec. 17, 2024, 4 pages.

Burak Gozluklu, "How task decomposition and smaller LLMs can make AI more affordable", Amazon Science , Available at https://www.amazon.science/blog/how-task-decomposition-and-smaller-llms-can-make-ai-more-affordable, Retrieved on Sep. 19, 2024, pp. 6.

* cited by examiner

DYNAMIC SECURITY FILTERING FOR MULTI-PROVIDER AI INFRASTRUCTURES

CROSS REFERENCE TO RELATED APPLICATIONS

This application claims priority to and the benefit of U.S. Provisional Patent Application Ser. No. 63/736,242, filed Dec. 19, 2024, the entire disclosure of which is incorporated herein by reference.

FIELD

This application relates generally to artificial intelligence (AI) systems and services, and specifically to intermediary systems for managing interactions between client applications and multiple artificial intelligence providers.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
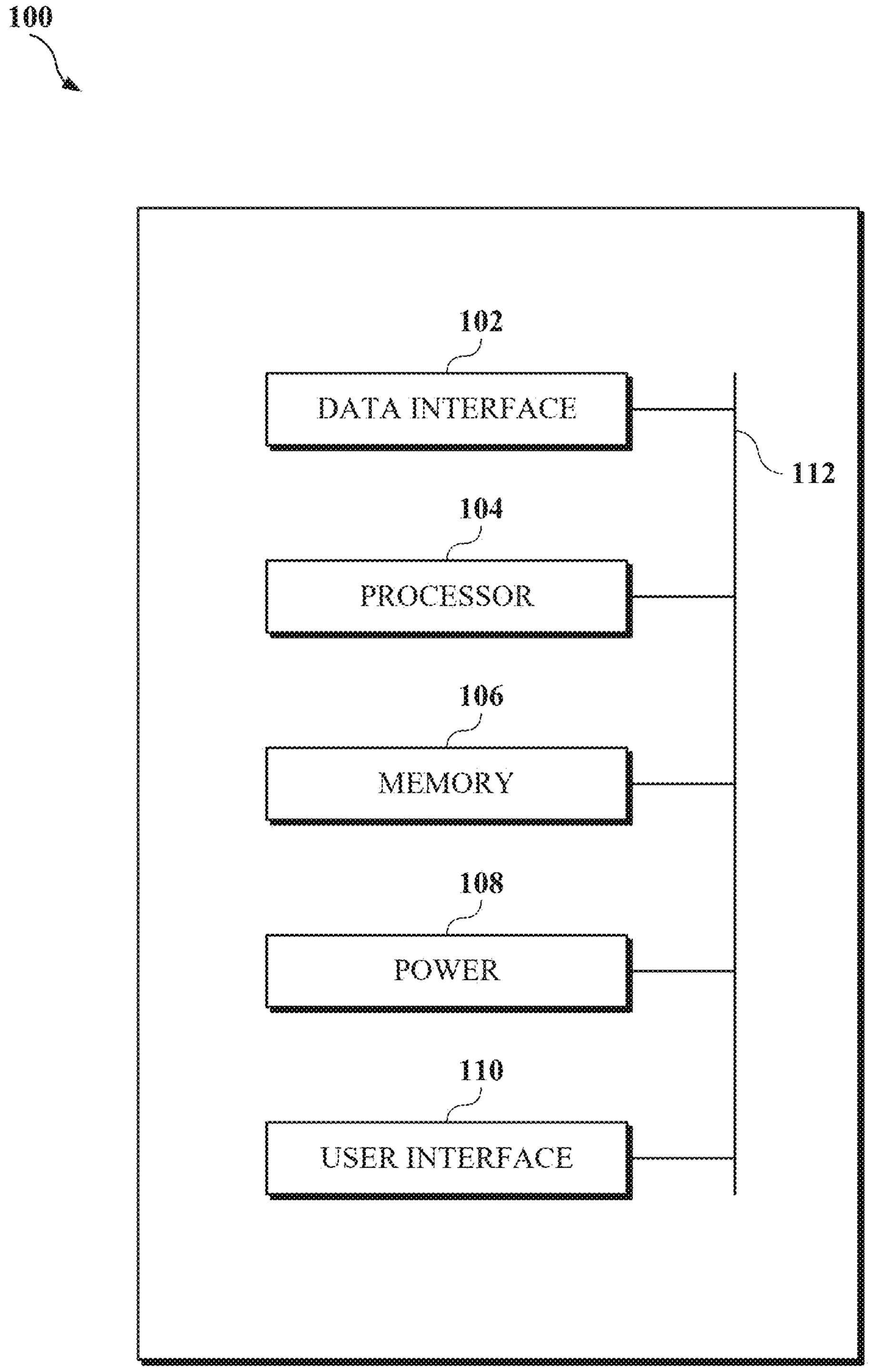
FIG. 1 is a block diagram of an example of a computing device.

Artificial intelligence (AI) technologies, particularly large language models (LLMs) and other AI models, have become increasingly prevalent across various industries and applications. Organizations seeking to leverage these technologies face several challenges in the current landscape. New AI models and providers frequently emerge, each offering unique features and requiring integration. These rapid changes make it difficult for organizations to adapt.

Organizations implementing AI capabilities often need to integrate with multiple AI service providers to ensure reliability and optimal performance across different use cases. However, managing these integrations presents significant technical challenges. For example, AI providers have unique application programming interfaces (API) specifications, require varied integration approaches, and handle context and memory differently. Additionally, organizations must consider factors such as cost optimization, security compliance, and the need to augment AI responses with internal organizational knowledge and data.

Current solutions often lead to tight coupling with specific AI providers, making it difficult to switch providers or leverage multiple providers effectively. While some Artificial-Intelligence as a Service (AIaaS) providers offer comprehensive solutions, these typically lock users into their specific ecosystems, limiting flexibility and potentially increasing costs. Moreover, organizations struggle to dynamically route tasks to optimal models based on real-time constraints like task type, availability, cost, and performance requirements.

Furthermore, as AI capabilities expand beyond simple query-response (e.g., prompt-completion) patterns to include more complex agentic behaviors—where AI systems can take autonomous actions and interact with various tools and services—organizations need more sophisticated orchestration capabilities. This includes managing dependencies among tasks, enabling parallel and sequential operations, and ensuring security and compliance. For example, a system may need to process a request involving multiple subtasks by distributing them to different AI models or tools, sequencing operations, and consolidating responses.

Implementations according to this disclosure solve problems such as these through an agentic AI intermediary (AAII) (also referred to as an AAII system) that provides a unified interface between client systems and multiple external AI providers, tools, and agents. The AAII includes an orchestrating agent that dynamically manages routing of requests, task decomposition, context augmentation, and integration with client systems based on configurable parameters and objectives.

In various implementations, the AAII includes multiple specialized engines working in concert. An AI model routing engine selects optimal AI models from multiple providers based on factors such as task requirements, cost constraints, and real-time availability. A context retrieval and augmentation engine enriches requests with relevant information from client knowledge bases, enabling AI models to provide more accurate and contextually appropriate responses. A security and compliance engine ensures sensitive information is appropriately handled, including anonymizing client data before forwarding it to external providers or processing sensitive requests entirely within the AAII.

The AAII can maintain different types of memory storage, including short-term session data and long-term contextual information. For instance, short-term memory can store chat histories to maintain continuity in user interactions across AI models, while long-term memory retains organizational knowledge for context augmentation. This enables consistent context maintenance even when switching between different AI providers, as the AAII can appropriately format and provide relevant historical context to each provider's specific requirements. Vector databases and embedding engines allow for efficient storage and retrieval of context information, while fine-tuning capabilities enable adaptation of AI models to specific client needs.

The AAII may implement scheduling capabilities that enable asynchronous and autonomous operations, enabling the AAII to handle complex sequences of tasks that may involve multiple AI models, tools, or agents. An evaluation engine may monitor the performance and reliability of external providers, enabling dynamic adjustment of routing decisions based on observed quality metrics. For example, if a provider's response quality declines, the AAII can automatically reconfigure routing to prioritize alternative models.

Through client-defined parameters and objectives, organizations (e.g., users of the AAII) can specify their preferences for model selection, fallback strategies, and integration requirements. The AAII can be configured through management interfaces that provide visibility into telemetry, logs, and performance metrics, enabling organizations to optimize their use of AI services while maintaining control over cost, quality, and security requirements. For instance, an organization could prioritize low-cost models during off-peak hours while reserving high-performance models for critical operations.

To describe some implementations in greater detail, reference is first made to examples of hardware and software structures used to implement an agentic intermediary system for managing, and integrating with, multiple AI providers. FIG. 1 is a block diagram of an example of a computing device 100. The computing device 100 may implement, execute, or perform, one or more aspects of the methods and techniques described herein. The computing device 100 includes a data interface 102, a processor 104, memory 106, a power component 108, a user interface 110, and a bus 112 (collectively, components of the computing device 100). Although shown as a distinct unit, one or more of the components of the computing device 100 may be integrated into respective distinct physical units. For example, the processor 104 may be integrated in a first physical unit and the user interface 110 may be integrated in a second physical unit. The computing device 100 may include aspects or components not expressly shown in FIG. 1, such as an enclosure or one or more sensors.

In some implementations, the computing device 100 is a stationary device, such as a personal computer (PC), a server, a workstation, a minicomputer, or a mainframe computer. In some implementations, the computing device 100 is a mobile device, such as a mobile telephone, a personal digital assistant (PDA), a laptop, or a tablet computer.

The data interface 102 communicates, such as transmits, receives, or exchanges, data via one or more wired, or wireless, electronic communication mediums, such as a radio frequency (RF) communication medium, an ultraviolet (UV) communication medium, a visible light communication medium, a fiber optic communication medium, a wireline communication medium, or a combination thereof. For example, the data interface 102 may include, or may be, a transceiver. Although not shown separately in FIG. 1, the data interface 102 may include, or may be operatively coupled with, an antenna for wireless electronic communication. Although not shown separately in FIG. 1, the data interface 102 may include, or may be operatively coupled with, a wired electronic communication port, such as an Ethernet port, a serial port, or another wired port, that may interface with, or may be operatively coupled to, a wired electronic communication medium. In some implementations, the data interface 102 may be or may include a network interface card (NIC) or unit, a universal serial bus (USB), a Small Computer System Interface (SCSI), a Peripheral Component Interconnect (PCI), a near field communication (NFC) device, card, chip, or circuit, or another component for electronic data communication between the computing device 100, or one or more of the components thereof, and one or more external electronic or computing devices. Although shown as one unit in FIG. 1, the data interface 102 may include multiple physical components, such as a wired data interface and a wireless data interface.

For example, the computing device 100 may electronically communicate, such as transmit, receive, or exchange computer accessible data, with one or more other computing devices via one or more wired or wireless communications links, or connections, such as via a network, using the data interface 102, which may include using one or more electronic communication protocols, which may be network protocols, such as Ethernet, Transmission Control Protocol/Internet Protocol (TCP/IP), user datagram protocol (UDP), power line communication (PLC), infrared, ultra violet (UV), visible light, fiber optic, wire line, general packet radio service (GPRS), Global System for Mobile communications (GSM), code-division multiple access (CDMA), Long-Term Evolution (LTE), Universal Mobile Telecommunications System (UMTS), Institute of Electrical and Electronics Engineers (IEEE) standardized protocols, or other suitable protocols.

The processor 104 is a device, a combination of devices, or a system of connected devices, capable of manipulating or processing an electronic, computer accessible, signal, or other data, such as an optical processor, a quantum processor, a molecular processor, or a combination thereof.

In some implementations, the processor 104 is implemented as a central processing unit (CPU), such as a microprocessor. In some implementations, the processor 104 is implemented as one or more special purpose processors, one or more graphics processing units, one or more digital signal processors, one or more microprocessors, one or more controllers, one or more microcontrollers, one or more integrated circuits, one or more Application Specific Integrated Circuits, one or more Field Programmable Gate Arrays, one or more programmable logic arrays, one or more programmable logic controllers, firmware, one or more state machines, or a combination thereof.

The processor 104 includes one or more processing units. A processing unit may include one or more processing cores. The computing device 100 may include multiple physical or virtual processing units (collectively, the processor 104), which may be interconnected, such as via wired, or hardwired, connections, via wireless connections, or via a combination of wired and wireless connections. In some implementations, the processor 104 is implemented in a distributed configuration including multiple physical devices or units that may be coupled directly or across a network. The processor 104 includes internal memory (not expressly shown), such as a cache, a buffer, a register, or a combination thereof, for internal storage of data, such as operative data, instructions, or both. For example, the processor 104 may read data from the memory 106 into the internal memory (not shown) for processing.

The memory 106 is a non-transitory computer-usable or computer-readable medium, implemented as a tangible device or component of a device. The memory 106 contains, stores, communicates, transports, or a combination thereof, data, such as operative data, instructions, or both. For example, the memory 106 stores an operating system of the computing device 100, or a portion thereof. The memory 106 contains, stores, communicates, transports, or a combination thereof, data, such as operative data, instructions, or both associated with implementing, or performing, the methods and techniques, or portions or aspects thereof, described herein. For example, the non-transitory computer-usable or computer-readable medium may be implemented as a solid-state drive, a memory card, removable media, a read-only memory (ROM), a random-access memory (RAM), any type of disk including a hard disk, a floppy disk, an optical disk, a magnetic or optical card, an application-specific integrated circuits (ASICs), or another type of non-transitory media suitable for storing electronic data, or a combination thereof. The memory 106 may include non-volatile memory, such as a disk drive, or another form of non-volatile memory capable of persistent electronic data storage, such as in the absence of an active power supply. The memory 106 may include, or may be implemented as, one or more physical or logical units.

The memory 106 stores executable instructions or data, such as application data, an operating system, or a combination thereof, for access, such as read access, write access, or both, by the other components of the computing device 100, such as by the processor 104. The executable instructions may be organized as program modules or algorithms, functional programs, codes, code segments, or combinations thereof to perform one or more aspects, features, or elements of the methods and techniques described herein. The application data may include, for example, user files, database catalogs, configuration information, or a combination thereof. The operating system may be, for example, a desktop or laptop operating system; an operating system for a mobile device, such as a smartphone or tablet device; or an operating system for a large device, such as a mainframe computer. For example, the memory 106 may be implemented as, or may include, one or more dynamic random-access memory (DRAM) modules, such as a Double Data Rate Synchronous Dynamic Random-Access Memory module, Phase-Change Memory (PCM), flash memory, or a solid-state drive.

The power component 108 obtains, stores, or both, power, or energy, used by the components of the computing device 100 to operate. The power component 108 may be implemented as a general-purpose alternating-current (AC) electric power supply, or as a power supply interface, such as an interface to a household power source or other external power distribution system. In some implementations, the power component 108 may be implemented as a single use battery or a rechargeable battery such that the computing device 100 operates, or partially operates, independently of an external power distribution system. For example, the power component 108 may include a wired power source; one or more dry cell batteries, such as nickel-cadmium (NiCad), nickel-zinc (NiZn), nickel metal hydride (NiMH), lithium-ion (Li-ion); solar cells; fuel cells; or any other device, or combination of devices, capable of powering the computing device 100.

The user interface 110 includes one or more units or devices for interfacing with an operator of the computing device 100, such as a human user. In some implementations, the user interface 110 obtains, receives, captures, detects, or otherwise accesses, data representing user input to the computing device, such as via physical interaction with the computing device 100. In some implementations, the user interface 110 outputs, presents, displays, or otherwise makes available, information, such as to an operator of the computing device 100, such as a human user.

The user interface 110 may be implemented as, or may include, a virtual or physical keypad, a touchpad, a display, such as a liquid crystal display (LCD), a cathode-ray tube (CRT), a light emitting diode (LED) display, an organic light emitting diode (OLED) display, an active-matrix organic light emitting diode (AMOLED), a touch display, a speaker, a microphone, a video camera, a sensor, a printer, or any combination thereof. In some implementations, a user interface 110 may be omitted, or absent, from the computing device 100.

The bus 112 distributes or transports data, power, or both among the components of the computing device 100 such that the components of the computing device are operatively connected. Although the bus 112 is shown as one component in FIG. 1, the computing device 100 may include multiple busses, which may be connected, such as via bridges, controllers, or adapters. For example, the bus 112 may be implemented as, or may include, a data bus and a power bus. The execution, or performance, of instructions, programs, code, applications, or the like, so as to perform the methods and techniques described herein, or aspects or portions thereof, may include controlling, such as by sending electronic signals to, receiving electronic signals from, or both, the other components of the computing device 100.

Although not shown separately in FIG. 1, data interface 102, the power component 108, or the user interface 110 may include internal memory, such as an internal buffer or register.

Although an example of a configuration of the computing device 100 is shown in FIG. 1, other configurations may be used. One or more of the components of the computing device 100 shown in FIG. 1 may be omitted, or absent, from the computing device 100 or may be combined or integrated. For example, the memory 106, or a portion thereof, and the processor 104 may be combined, such as by using a system on a chip design.

Figure 2:
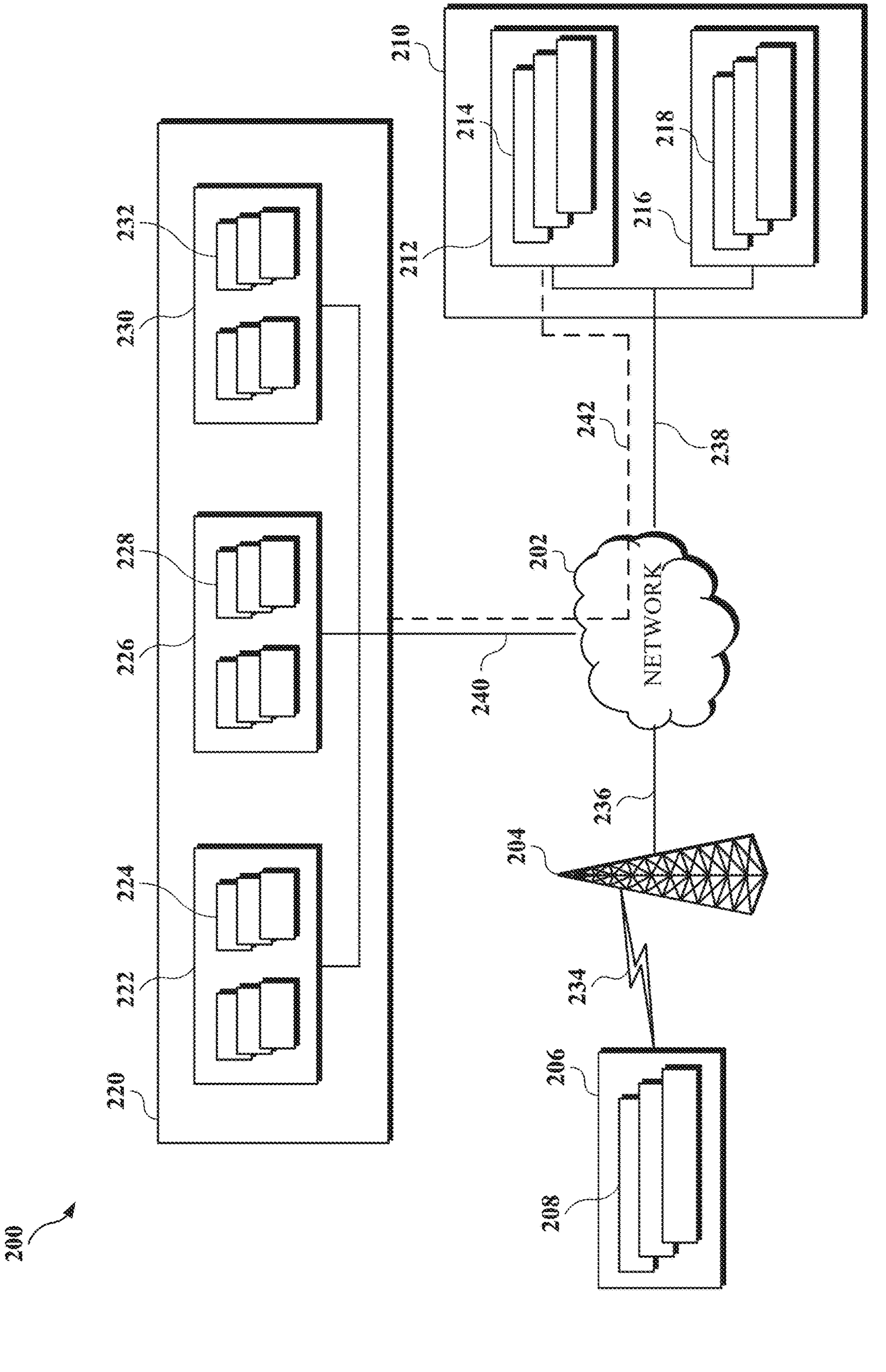
FIG. 2 is a block diagram of an example of a computing and communications system.

FIG. 2 is a diagram of an example of a computing and communications system 200. The computing and communications system 200 includes a first network 202, an access point 204, a first computing and communications device 206, a second network 210, and a third network 220. The second network 210 includes a second computing and communications device 212 and a third computing and communications device 216. The third network 220 includes a fourth computing and communications device 222, a fifth computing and communications device 226, and a sixth computing and communications device 230. Other configurations, including fewer or more computing and communications devices, fewer or more networks, and fewer or more access points, may be used.

One or more of the networks 202, 210, 220 may be, or may include, a local area network (LAN), wide area network (WAN), virtual private network (VPN), a mobile or cellular telephone network, the Internet, or any other means of electronic communication. The networks 202, 210, 220 respectively transmit, receive, convey, carry, or exchange wired or wireless electronic communications using one or more communications protocols, or combinations of communications protocols, the transmission control protocol (TCP), the user datagram protocol (UDP), the internet protocol (IP), the real-time transport protocol (RTP), the HyperText Transport Protocol (HTTP), or a combination thereof. For example, a respective network 202, 210, 220, or respective portions thereof, may be, or may include a circuit-switched network, or a packet-switched network wherein the protocol is a packet-based protocol. A packet is a data structure, such as a data structure that includes a header, which may contain control data or 'meta' data describing the packet, and a body, or payload, which may contain the substantive data conveyed by the packet.

The access point 204 may be implemented as, or may include, a base station, a base transceiver station (BTS), a Node-B, an enhanced Node-B (eNode-B), a Home Node-B (HNode-B), a wireless router, a wired router, a hub, a relay, a switch, a bridge, or any similar wired or wireless device. Although the access point 204 is shown as a single unit, an access point can include any number of interconnected elements. Although one access point 204 is shown, fewer or more access points may be used. The access point 204 may communicate with other communicating devices via wired or wireless electronic communications links or via a sequence of such links.

As shown, the access point 204 communicates via a first communications link 234 with the first computing and communications device 206. Although the first communications link 234 is shown as wireless, the first communications link 234 may be implemented as, or may include, one or more wired or wireless electronic communications links or a sequence of such links, which may include parallel communications links for multipath communications.

As shown, the access point 204 communicates via a second communications link 236 with the first network 202. Although the second communications link 236 is shown as wired, the second communications link 236 may be implemented as, or may include, one or more wired or wireless electronic communications links or a sequence of such links, which may include parallel communications links for multipath communications.

As shown, the first network 202 communicates with the second network 210 via a third communications link 238. Although the third communications link 238 is shown as wired, the third communications link 238 may be implemented as, or may include, one or more wired or wireless electronic communications links or a sequence of such links, which may include parallel communications links for multipath communications.

As shown, the first network 202 communicates with the third network 220 via a fourth communications link 240. Although the fourth communications link 240 is shown as wired, the fourth communications link 240 may be implemented as, or may include, one or more wired or wireless electronic communications links or a sequence of such links, which may include parallel communications links for multipath communications.

The computing and communications devices 206, 212, 216, 222, 226, 230 are, respectively, computing devices, such as the computing device 100 shown in FIG. 1. For example, the first computing and communications device 206 may be a user device, such as a mobile computing device or a smartphone, the second computing and communications device 212 may be a user device, such as a laptop, the third computing and communications device 216 may be a user device, such as a desktop, the fourth computing and communications device 222 may be a server, such as a database server, the fifth computing and communications device 226 may be a server, such as a cluster or a mainframe, and the sixth computing and communications device 230 may be a server, such as a web server.

The computing and communications devices 206, 212, 216, 222, 226, 230 communicate, or exchange data, such as voice communications, audio communications, data communications, video communications, messaging communications, broadcast communications, or a combination thereof, with one or more of the other computing and communications devices 206, 212, 216, 222, 226, 230 respectively using one or more of the networks 202, 210, 220, which may include communicating using the access point 204, via one or more of the communications links 234, 236, 238, 240.

For example, the first computing and communications device 206 may communicate with the second computing and communications device 212, the third computing and communications device 216, or both, via the first communications link 234, the access point 204, the second communications link 236, the network 202, the third communications link 238, and the second network 210. The first computing and communications device 206 may communicate with one or more of the third computing and communications device 222, the fourth computing and communications device 226, the fifth computing and communications device 226, via the first communications link 234, the access point 204, the second communications link 236, the network 202, the fourth communications link 240, and the third network 220.

For simplicity and clarity, the sequence of communications links, access points, networks, and other communications devices between a sending communicating device and a receiving communicating device may be referred to herein as a communications path. For example, the first computing and communications device 206 may send data to the second computing and communications device 212 via a first communications path, or via a combination of communications paths including the first communications path, and the second computing and communications device 212 may send data to the first computing and communications device 206 via the first communications path, via a second communications path, or via a combination of communications paths, which may include the first communications path.

The first computing and communications device 206 includes, such as executes, performs, or operates, one or more applications or services 208. The second computing and communications device 212 includes, such as executes, performs, or operates, one or more applications or services 214. The third computing and communications device 216 includes, such as executes, performs, or operates, one or more applications or services 218. The fourth computing and communications device 222 includes, such as stores, hosts, executes, performs, or operates, one or more documents, applications or services 224. The fifth computing and communications device 226 includes, such as stores, hosts, executes, performs, or operates, one or more documents, applications, or services 228. The sixth computing and communications device 230 includes, such as stores, hosts, executes, performs, or operates, one or more documents, applications or services 232.

In some implementations, one or more of the computing and communications devices 206, 212, 216, 222, 226, 230 may communicate with one or more other computing and communications devices 206, 212, 216, 222, 226, 230, or with one or more of the networks 210, 220, via a virtual private network. For example, the second computing and communications device 212 is shown as communicating with the third network 220, and therefore with one or more of the computing and communications devices 222, 226, 230 in the third network 220, via a virtual private network 242, which is shown using a broken line to indicate that the virtual private network 242 uses the first network 202, the third communications link 238, and the fourth communications link 240.

In some implementations, two or more of the computing and communications devices 206, 212, 216, 222, 226, 230 may be in a distributed, or clustered, configuration. For example, the third computing and communications device 222, the fourth computing and communications device 226, and the fifth computing and communications device 226 may, respectively, be elements, or nodes, in a distributed configuration.

In some implementations, one or more of the computing and communications devices 206, 212, 216, 222, 226, 230 may be a virtual device. For example, the third computing and communications device 222, the fourth computing and communications device 226, and the fifth computing and communications device 226 may, respectively, be virtual devices operating on shared physical resources.

Figure 3:
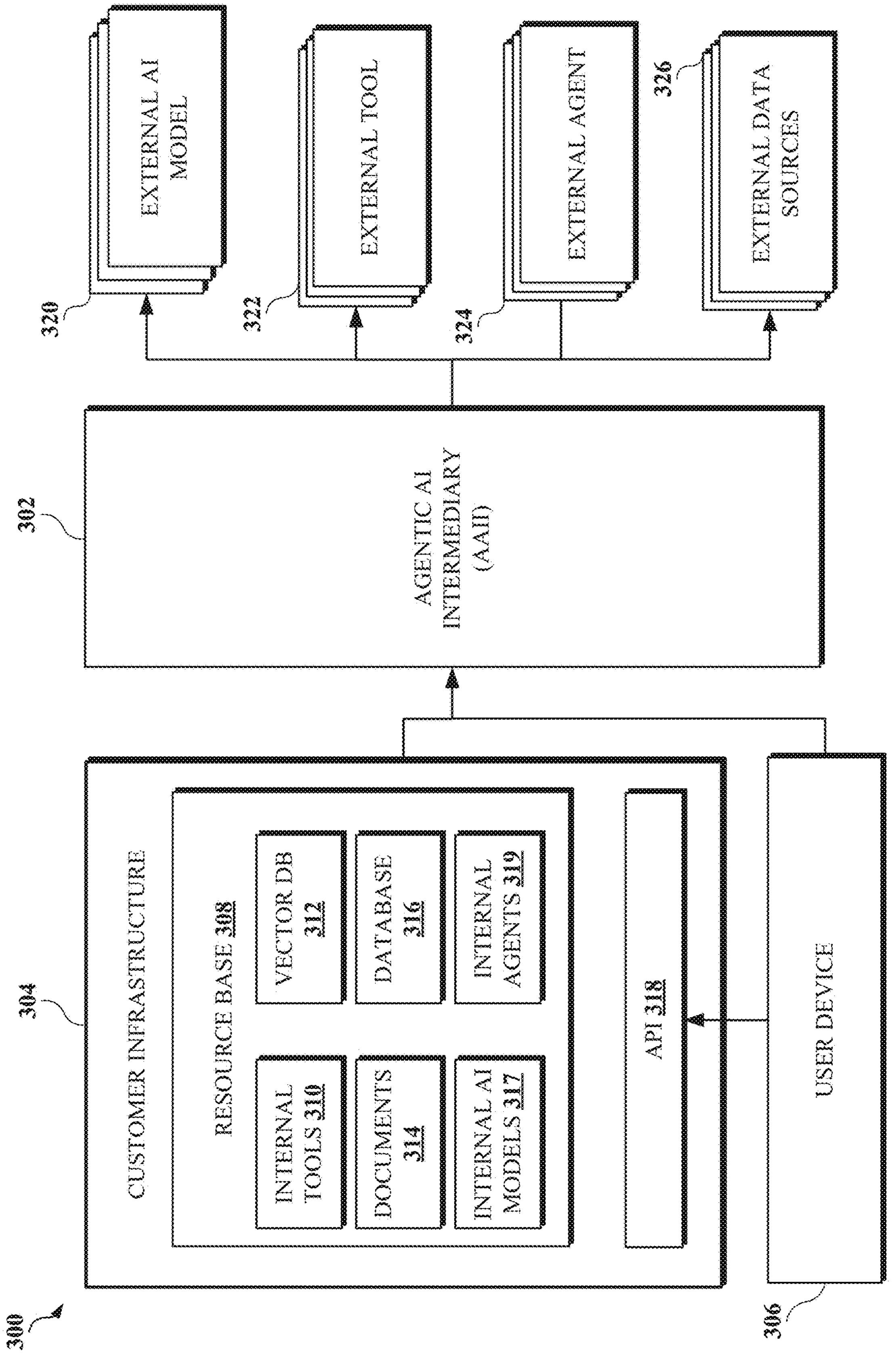
FIG. 3 is a high-level diagram of a system for managing and interacting with multiple AI providers.

FIG. 3 is a high-level diagram of a system 300 for managing and interacting with multiple AI providers. An AAII 302 provides services to a customer (e.g., an organization), which manages a customer infrastructure 304. One or more applications of the customer infrastructure 304 may be accessible to users (internal and/or external to the customer infrastructure 304) via user devices, such as a user device 306.

The AAII 302 acts as an intelligent intermediary between the customer infrastructure 304 (e.g., applications deployed therein) and various external AI that implement or provide external AI models 320, external tool providers that implement or provide external tools 322, external agent providers that provide or implement external agents 324, and/or external data providers that provide or implement external data sources 326. The term "external" indicates that these AI models, tools, and agents are provided or implemented by systems, platforms, or services outside the direct control of the customer infrastructure 304 or the AAII 302 itself. The AAII 302 dynamically selects and orchestrates these external resources to fulfill client requests, optimize performance, and enhance AI capabilities.

The components shown in FIG. 3 may be implemented using the computing and communications infrastructure described with respect to FIG. 2. The user device 306 may be the user device 206 of FIG. 2. The customer infrastructure 304 may be implemented across one or more networks, such as the second network 210 of FIG. 2, with various components distributed across computing devices such as the computing and communications devices 212, 216 shown in FIG. 2. The AAII 302 may be implemented across multiple computing and communications devices in a distributed configuration, such as the computing and communications devices 222, 226, 230 shown in the third network 220 of FIG. 2. The external AI models 320, the external tools 322, the external agents 324, and the external data sources 326 may be hosted on computing and communications devices in separate networks, such as the third network 220 of FIG. 2, with different providers' services running on computing and communications devices similar to devices 222, 226, and 230 shown in FIG. 2.

Client requests can vary in complexity and may include multiple tasks for completion by an AI model. A client request can be received as a discrete request or as a continuous stream of data such as text, audio, video, or other formats. For example, a client request might come from a voice call or real-time video feed. Client requests might include simple or complex queries requiring direct AI model responses. Examples of requests include, but are not limited to, checking the current shipping status for an order; document generation tasks, such as drafting correspondence requesting information; complex multi-step operations, such as analyzing sales data and generating reports; and interactive sessions requiring context maintenance, such as customer service chatbot conversations that need to maintain context across multiple exchanges.

For complex requests, the AAII 302 can analyze and decompose them into component tasks. Using the sales data analysis example, the AAII 302 might break this down into data retrieval and analysis, requiring access to one or more components of an internal resource base (e.g., the resource base 308), such as a database 316 or internal tools 310, and potentially an AI model specialized in data analysis. Report generation might require a language model capable of narrative generation, while scheduling actions might require access to external tools, such as the external tool 322, for email and calendar management.

The AAII 302 selects appropriate external resources based on multiple criteria. These criteria may include the task type and complexity, such as selecting specialized AI models for specific tasks like data analysis or natural language generation; performance requirements, such as meeting response time and accuracy thresholds; cost considerations, such as choosing less expensive models for simple tasks while reserving advanced models for more demanding operations; resource availability, such as falling back to alternative providers if primary services are unavailable; and context requirements, such as selecting models capable of handling longer context windows for tasks requiring extensive background information.

This dynamic selection and routing enable efficient handling of varying types of requests, from simple chatbot interactions to more complex multi-step operations requiring coordination of multiple external services. The AAII 302 can orchestrate these resources in parallel or in sequence as needed to fulfill the client's requirements while optimizing for factors such as cost, performance, and reliability.

The customer infrastructure 304 includes a resource base 308 containing various types of information and systems that may be accessed by or provide resources or data to the AAII 302. The resource base 308 includes several components, which are further described herein. One example component is internal tools, such as the internal tools 310, that may be used for specific functions like proprietary analytics, internal resource management, or automated workflows. The AAII 302 can access these tools to perform tasks such as retrieving specialized internal data or triggering internal workflows in response to external requests.

The vector database 312 stores embeddings and other data structures used for retrieval-augmented generation (RAG). The AAII 302 uses the vector database 312 to fetch contextually relevant information dynamically, improving the accuracy and relevance of responses generated by AI models. Documents, such as the documents 314, may include business documents, contracts, policies, or other records. The AAII 302 can access these documents to retrieve data, extract insights, or provide references for tasks like contract drafting or policy compliance.

Databases, such as the database 316, may store structured data, such as customer records, sales figures, or operational metrics. The AAII 302 may use such data for operations like data analysis, report generation, and personalized responses. The API layer 318 serves as the interface between the AAII 302 and the customer infrastructure 304. It enables the AAII 302 to access internal tools, databases, and other resources dynamically, facilitating seamless integration with the customer's systems. However, there can be other mechanisms via which the AAII 302 can access the customer infrastructure 304.

The external AI models 320 are used by the AAII 302 for AI-related tasks such as natural language processing (e.g., understanding, generation, etc.), image processing (e.g., recognition, understanding, or generation), or data classification, amongst others. The external AI models 320 are dynamically selected based on the specific requirements of each request or task received by the AAII 302. The external tools 322 may include third-party APIs, actuators, or services. The AAII 302 can call these tools to perform actions such as scheduling, payment processing, or interacting with IoT devices, amongst other examples. The external agents 324 may be or refer to autonomous systems or agents capable of performing complex tasks or interacting with other systems. The AAII 302 integrates these agents to expand the range of supported functionalities, such as autonomous problem-solving or real-time decision-making.

The external data sources 326 may provide access to publicly available or licensed third-party data repositories, knowledge bases, and information services that can be utilized by the AAII 302. These external data sources 326 may include public databases, open datasets, industry-specific information repositories, news feeds, academic publications, or other structured and unstructured data collections. The AAII 302 can leverage the external data sources 326 to augment its processing capabilities and/or enhance the context available for AI operations.

The resource base 308 may include internal AI models 317, internal tools 310, and internal agents 319 that the AAII 302 uses similarly to the external AI models 320, the external tools 322, and the external agents 324, respectively.

Figure 4A:
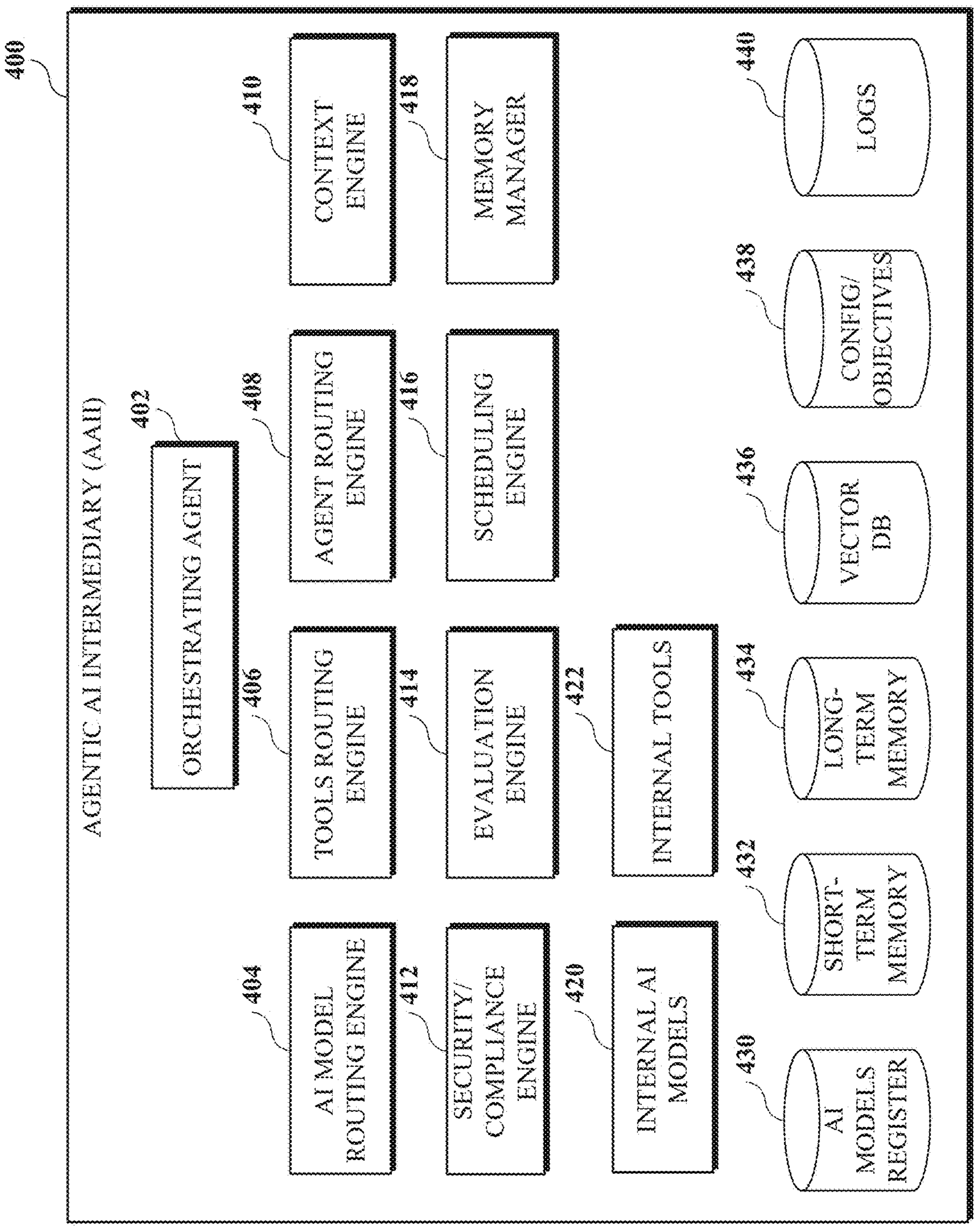
FIG. 4A is a block diagram of example functionality of an agentic AI intermediary (AAII), which may be, for example, the AAII of FIG. 3.

FIG. 4A is a block diagram of example functionality of an AAII 400, which may be, for example, the AAII 302 of FIG. 3. The AAII 400 includes engines, such as tools, modules, programs, subprograms, functions, routines, subroutines, operations, executable instructions, and/or the like for, inter alia and as further described below, managing AI model selection, routing tasks, augmenting context, and coordinating internal and external resources.

At least some of the engines of the AAII 400 can be implemented as respective software programs that may be executed by one or more computing devices. A software program can include machine-readable instructions that may be stored in a memory, and that, when executed by a processor, may cause the computing device to perform the instructions of the software program. These engines are designed to interact with external systems, client infrastructure, and various internal components to achieve intelligent orchestration and seamless integration.

As shown, the AAII 400 includes an orchestrating agent 402, an AI model routing engine 404, a tools routing engine 406, an agent routing engine 408, a context engine 410 (i.e., a context retrieval/augmentation engine), a security/compliance engine 412, an evaluation engine 414, a scheduling engine 416, a memory manager 418, internal AI models 420, and internal tools 422. The AAII 400 may include fewer, more, or other engines. In some implementations, two of more engines may be combined and/or an engine may be split into more than one engine. The AAII 400 is also shown as including data stores including an AI models register 430, a short-term memory 432, a long-term memory 434, a vector database 436, a configuration/objectives database 438, and logs 440. The AAII 400 may include fewer, more, or other data stores. In some implementations, two of more data stores may be combined and/or a data store may be split into more than one data store. The AAII 400 may additionally include caches for rapid access to frequently used data and session stores for maintaining state across multiple related interactions.

The orchestrating agent 402 is the central component of the AAII 400. The orchestrating agent 402 can be thought of as the "brain" of the AAII 400, making intelligent decisions based on predefined rules, dynamic algorithms, and, in some cases, machine learning models. By coordinating the various components of the AAII 400, the orchestrating agent 402 enables the efficient and effective delivery of AI services tailored to client needs.

The orchestrating agent 402 is responsible for receiving client requests from a requester, which may be a human or programmatic user, internal or external to a customer infrastructure, such as the customer infrastructure 304 of FIG. 3. The orchestrating agent 402 analyzes the received requests and determines optimal courses of action to fulfill those requests. This includes dynamically selecting and coordinating various external AI models (such as the one or more of the external AI models 320 of FIG. 3), tools (such as one or more of the external tools 322 of FIG. 3), and agents (such as one or more of the external agents 324 of FIG. 3) based on factors such as task/request requirements, cost constraints, and real-time availability.

The orchestrating agent 402 serves as the primary coordinator, receiving client requests through client-facing APIs and decomposing these requests into individual tasks. For example, in response to a complex request for analyzing sales data and generating a report, the orchestrating agent 402 may direct the context engine 410 to retrieve relevant client data, use the AI model routing engine 404 to select a data analysis model, and employ the tools routing engine 406 to schedule report generation via an external tool.

The orchestrating agent 402 also manages the integration of the AAII 400 with a customer infrastructure (e.g., resources available in the customer infrastructure 304 of FIG. 3 usable for fulfilling the request), enabling access to internal knowledge bases, databases, and/or tools. The orchestrating agent 402 may handle or enable context retrieval and augmentation by leveraging short-term and long-term memory stores or vector databases, stored in the short-term memory 432, the long-term memory 434, or customer vector databases (such as the vector database 312 of FIG. 3), respectively. In some implementations, the vector database 436, if used to also store customer embeddings, may also be used for context retrieval. "Context," as used herein, refers to the information provided as input or inferred from prior interactions that helps an AI model (or other tools or agents) understand and respond accurately to a given query or task. This may include the surrounding text, previous user interactions, embeddings representing relevant knowledge, task-specific instructions, or additional data that frames the meaning and intent of the current input. Context ensures that the model generates coherent, relevant, and informed responses tailored to the specific query or task. As such, the orchestrating agent 402 ensures that AI models receive the necessary information to generate accurate and contextually relevant responses.

The AI model routing engine 404 dynamically selects the most appropriate AI model to process each incoming request. It evaluates factors such as task complexity, real-time availability, cost, and performance metrics to ensure that requests are routed to the optimal AI model for a given task. For example, simple tasks like basic classification may be routed to less resource-intensive AI models, while more complex tasks, such as natural language generation, are directed to high-performance AI models. If a preferred AI model is unavailable or experiencing high latency, the AI model routing engine 404 can dynamically switch to an alternative AI model to maintain uninterrupted service.

The AI model routing engine 404 selects models from the AI models register 430, which catalogs internal and external AI models along with their metadata, capabilities, and performance metrics. The AI model routing engine 404 may also incorporate external AI models dynamically to expand the pool of available AI models for diverse client needs. In some cases, the AI model routing engine 404 routes requests to one of the internal AI models 420, particularly when the internal model is better suited for a specific task. For instance, in a chatbot scenario, a simple "Hi" request from a user may be routed to one of the internal AI models 420 optimized for low-cost, low-complexity responses. This approach minimizes resource utilization and latency while maintaining responsiveness.

The AI model routing engine 404 balances performance requirements with budgetary constraints by considering the cost of using different AI models. Routine tasks may be assigned to less expensive models, while more powerful, costlier models are reserved for complex or critical requests. Additionally, the engine leverages historical performance data and quality metrics, such as accuracy and latency, to inform its decisions. For example, the AI model routing engine 404 may favor AI models that have demonstrated high reliability and desirable performance characteristics in the past.

The AI model routing engine 404 may implement cost optimization by matching query complexity with appropriate model tiers. To illustrate, simple queries like greeting messages ("hi", "hello") are automatically routed to lightweight, cost-effective models or served from cache, while complex analytical queries are directed to more capable but expensive models. This tiered routing approach ensures optimal resource utilization while maintaining appropriate response quality for each interaction type. The AI model routing engine 404 can dynamically adjust these routing decisions based on real-time monitoring of query patterns and response requirements.

To refine its model selection further, the AI model routing engine 404 collaborates with the evaluation engine 414. The evaluation engine 414 provides feedback on the quality of responses generated by different AI models. The evaluation engine 414 may use feedback collected from both client systems and end-users. End-user feedback can be gathered through various mechanisms, such as ratings collected after completing a full session (e.g., after a chat conversation or voice call) or immediate feedback on individual interactions (e.g., thumbs up/down responses to specific messages). The feedback enables the AI model routing engine 404 to adapt its routing strategies over time. This feedback loop ensures continuous optimization, allowing the system to consistently route requests to the most effective and efficient AI models. The AI model routing engine 404 may use instructions or rules from the orchestrating agent 402, data stored in the configuration/objectives database 438, and information from other engines or data stores, either individually or in combination.

Building upon this evaluation feedback loop, the AI model routing engine 404 may select models dynamically based on a variety of parameters to optimize performance for specific tasks. Purely technical parameters, such as latency, speed, availability, and price, can be used in this selection process. For instance, for real-time applications (e.g., customer service chatbots), the AI model routing engine 404 may prioritize models with low latency and high availability, such as those exhibiting minimal response times (e.g., measured in seconds or tokens per second), while for cost-sensitive operations, models with lower pricing per million tokens may be favored. These technical considerations, informed by the evaluation data, enable the AAII to efficiently route requests to models that meet constraints, including performance and budgetary constraints.

Additionally, the AI model routing engine 404 may incorporate policy-based and AI-specific parameters to guide model selection. Policy-based factors may include geographic computing restrictions (e.g., prioritizing models hosted in specific regions like the United States, the European Union, or Asia), compliance with data privacy requirements (e.g., ensuring models are not trained on user data), or preferences for open-source models or avoiding certain origins (e.g., not made in certain countries or by certain companies). AI-specific capabilities, such as context window size, token limits, specialized abilities (such as tool use, code generation, or visual understanding), and instruction-following capability further refine the selection process. The AI model routing engine 404 may leverage (e.g., use) quality benchmarks and use-case alignment—e.g., evaluating models against standardized language model benchmarks or comparing performance metrics like accuracy, robustness, and context window size—to identify the most suitable model for a given task, thereby aligning with client-defined objectives stored in the configuration/objectives database 438.

To illustrate, in a use case requiring text summarization for legal documents, the AI model routing engine 404 may select a model based on its performance in benchmarks like Massive Multitask Language Understanding (MMLU) for general knowledge or HumanEval (a benchmark dataset that evaluates the performance of LLMs in code generation tasks) for coding proficiency, prioritizing high quality and factual accuracy while adhering to low-latency and data privacy policies. Alternatively, for a code generation task in a software development scenario, the AI model routing engine 404 may choose a model excelling in benchmarks like Berkeley Function Calling Leaderboard or Massive Bash-Python Programming Benchmark (MBPP), optimizing for speed and cost-effectiveness while ensuring the model supports a large context window. Such selection decisions can be continuously refined through the evaluation data provided by the evaluation engine 414, creating an adaptive system that improves its routing decisions over time based on observed performance.

Rules for selecting an appropriate AI model can be applied in various configurations to optimize task fulfillment. One approach includes a static list of models configured through a control panel, where all requests associated with a specific API key are forwarded to the first model in the list. If that model is unavailable or underperforming (e.g., based on latency, accuracy, or availability thresholds), routing may fall back to the next model in the sequence, or requests may be distributed using load-balancing techniques such as random, weighted, or round-robin distribution.

Alternatively, or additionally, the AAII 400 may support rule-based configurations defined in the control panel, thereby leveraging a broader set of parameters to dynamically select an optimal model. These parameters, as previously described, may include technical factors (e.g., latency, speed, price), policy-based constraints (e.g., geographic restrictions, data privacy), AI-specific capabilities (e.g., text generation, reasoning), and quality benchmarks (e.g., MMLU, HumanEval). The AI model routing engine 404 may apply an algorithm or formula, stored in the configuration/objectives database 438, to evaluate and rank models based on such criteria, thereby aligning with client-defined objectives and real-time system conditions, as coordinated by the orchestrating agent 402 and AI model routing engine 404.

Alternatively, or additionally, AI/ML-based model selection may be implemented. The AI/ML-based model selection may optionally incorporate a feedback loop for continuous improvement. In this approach, a small set of predefined rules or targets (e.g., performance thresholds, cost constraints) may guide an embedded AI/ML model, which dynamically decides the optimal model for each request. Historical performance data from the logs 440 and real-time metrics may be used to refine selections over time. Additionally, dynamic client-driven selection may be implemented, where clients specify a provider or model name (or a list of model names) with each API request, or provide needed parameters (e.g., latency requirements, use case) per call, allowing the AAII to route requests accordingly.

Alternatively, or additionally, tagged rulesets may be used, where complex preconfigured scenarios or rulesets are defined and associated with specific tags or names. Clients can select one or more rulesets by name or tag with an API call, enabling tailored model selection for diverse use cases (e.g., text summarization, code generation). These tagged rulesets, managed via the configuration/objectives database 438, can be combined with other selection mechanisms, such as static lists, smarter rules, or AI/ML-based selection, to create hybrid strategies that adapt to varying client needs and system conditions.

The tools routing engine 406 facilitates the integration, invocation, and management of tools, including both external tools, such as third-party APIs and actuators, and internal tools 422. It ensures seamless interactions between these tools and the AAII by handling API calls, response processing, and error management. The tools routing engine 406 retrieves task-specific instructions from the configuration/objectives database 438, ensuring that tools are invoked in accordance with client-defined requirements.

The tools routing engine 406 can manage tasks that impact virtual or physical environments, such as sending notifications, performing database updates, or triggering actuators. For example, it may invoke a third-party API to process a payment or call an internal tool 422 to update a proprietary database. Similar to the AI model routing engine 404, the tools routing engine 406 dynamically selects and invokes the appropriate tool based on task requirements and/or configuration rules. The agent routing engine 408 enables the system to coordinate with external AI agents, which are autonomous systems capable of decision-making or executing complex tasks. For example, the agent routing engine 408 may interact with a logistics agent to track shipments or a scheduling agent to manage workflows across multiple departments.

The context engine 410 retrieves and augments task-related context to enhance the accuracy and relevance of AI-generated responses. Managed by the orchestrating agent 402 or operating independently in specific scenarios, such as embedding, fine-tuning, or AI model training, the context engine 410 plays a central role in data and memory management. The context engine 410 may interact with one or more of the short-term memory 432, the long-term memory 434, and/or one resource base (e.g., the resource base 308) components of a customer infrastructure to provide relevant context for tasks.

For example, in a customer service scenario, the context engine 410 may enrich a query about a delayed shipment by retrieving the client's historical order records stored in the long-term memory 434. Similarly, in a chatbot scenario, if a user asks, "Where is my delivery?" after an initial "Hi," the context engine 410 may retrieve relevant data from historical records, augmenting the query before routing it to an external AI model. These capabilities enable the context engine 410 to deliver enriched input to AI models, ensuring precise and context-aware responses.

The security/compliance engine 412 ensures compliance with privacy regulations, safeguards sensitive client data, and enforces security and compliance policies. The security/compliance engine 412 achieves this by anonymizing inputs before transmitting them to external providers, filtering confidential information, and enforcing access control measures to restrict unauthorized access. To illustrate, when processing legal documents or contracts, the security/compliance engine 412 may replace specific company names, individual identifiers, or sensitive terms with generic placeholders before transmission to external AI models. These placeholders are then systematically replaced with the original values in the response, ensuring sensitive information remains protected while maintaining the coherence and utility of the AI-generated content. This approach is particularly critical in scenarios involving financial data, healthcare information, or proprietary business terms that demand strict confidentiality. The security/compliance engine 412 is further described with respect to FIG. 4C and FIG. 4D.

In some implementations, the security/compliance engine 412 may be deployed within the customer infrastructure, such as the customer infrastructure 304 shown in FIG. 3. By operating within the customer's environment, the security/compliance engine 412 can prevent sensitive data from ever leaving the customer's network. This approach offers several benefits, including enhanced data privacy, reduced exposure to third-party providers, and greater control over compliance with internal policies and external regulations. For example, a healthcare organization may deploy the security/compliance engine 412 on-premises to ensure that protected health information (PHI) is anonymized or processed entirely within its secure infrastructure.

As such, the architecture of the security/compliance engine 412 may support flexible deployment models to accommodate varying security requirements. Organizations can choose to deploy the security/compliance engine entirely within their infrastructure, creating a secure enclave where sensitive data processing occurs before any external transmission. This deployment option is particularly beneficial for organizations in regulated industries or those handling highly sensitive data, as it provides maximum control over data security and compliance. The security/compliance engine can operate as a gateway, ensuring that only appropriately processed and sanitized data reaches external AI providers or tools. Thus, a request to be transmitted to the AAII 400 may be routed via a locally deployed security/compliance engine; or a request may first be transmitted to a locally deployed instance of the security/compliance engine to obtain a compliant request, and then the compliant request may be transmitted to the AAII 400, thereby ensuring sensitive data is properly sanitized before leaving the organization's infrastructure.

The evaluation engine 414 monitors and evaluates the quality, performance, and reliability of external and internal AI models, tools, and agents used by or within the AAII 400. The evaluation engine 414 may collect telemetry data and response metrics from the logs 440, analyzing this information to assess the effectiveness of both internal and external resources. The evaluation engine 414 updates performance metrics in the AI models register 430, creating a continuous feedback loop that enables the system to refine its routing decisions over time. This ensures that the most reliable and high-performing resources are prioritized for handling client requests.

The evaluation engine 414 assesses various parameters, including response accuracy, latency, and failure rates, to generate a comprehensive performance profile for each resource. For instance, if an external AI model consistently exhibits high latency during peak hours, the evaluation engine 414 records this information and adjusts the routing logic to favor alternative AI models during those periods. Similarly, the evaluation engine 414 can detect degraded performance or anomalies in internal tools and recommend adjustments to optimize their usage.

The evaluation engine 414 can play a critical role in maintaining system efficiency. For example, when routing requests to external AI models for tasks like language generation, the evaluation engine 414 may assess the quality of the generated responses and provide feedback to improve future model selection. If a response from an external agent or tool fails to meet predefined thresholds, the evaluation engine 414 flags the issue for further analysis, ensuring consistent system reliability.

The scheduling engine 416 can be used to manage the timing, prioritization, and execution of tasks within the AAII. It enables asynchronous operations by queuing tasks for later execution, initiating autonomous internal tasks, and coordinating workflows that require multiple resources. The scheduling engine 416 can be used for maintaining task queues and adjusting execution timing based on system load, resource availability, and task priority.

While scheduling engine 416 may function as part of the orchestrating agent 402, it may also operate independently to handle specific scheduling requirements. For example, the scheduling engine 416 may schedule a series of data processing steps, such as data retrieval, analysis, and report generation, to be executed overnight. This approach minimizes resource costs during peak hours while ensuring timely completion of the tasks. To illustrate, the scheduling engine 416 can manage tasks that require repeated execution, such as scheduling a task to query an external tool or model every hour to monitor system performance or track updates.

As another example, a scheduled AI task might involve monitoring a document repository and triggering automated summarization whenever new documents are added. In this scenario, the scheduling engine 416 periodically checks the repository for new content, and when detected, it coordinates with the AI model routing engine 404 to select an appropriate summarization AI model, retrieves relevant context through the context engine 410, and schedules the summarization task during off-peak hours to optimize costs. In some implementations, the generated summaries can then be automatically embedded in the vector database 436 for future retrieval and context augmentation.

The memory manager 418 can be used to organize, retrieve, and coordinate stored data so that, for example, appropriate context is available for each task within the AAII 400. The memory manager 418 manages access to all memory systems, including short-term memory 432 for active session data and long-term memory 434 for historical records. The memory manager 418 may additionally manage access to vector databases for embeddings and semantic search. The memory manager 418 also implements caching strategies, using the cache to store temporary data for quick access during ongoing sessions, thereby optimizing performance and reducing latency.

To further optimize performance and reduce unnecessary model invocations, the AAII 400 may implement intelligent caching strategies for common queries. For example, in customer service scenarios, frequently asked simple questions like initial greetings can be served directly from the cache without invoking an AI model. This optimization significantly reduces latency and costs while maintaining response quality for routine interactions. The caching strategy is particularly effective for high-frequency, low-complexity queries that typically yield consistent responses.

The memory manager 418 ensures seamless integration between the various memory components to provide relevant context for tasks. To illustrate, in a customer service scenario, the memory manager 418 retrieves data from the short-term memory 432 to maintain conversational continuity during a chatbot interaction, while simultaneously accessing historical order records from the long-term memory 434 to augment the context of the response. The vector database 436 may be used to retrieve semantically relevant information, enriching the AI-generated output. The vector database 436 contains public and semi-public information used for model fine-tuning and knowledge augmentation, providing general domain knowledge to enhance AI model responses. In some implementations, the vector database 436 may only be used for fine-tuning. In such implementations, the vector database 436 is not used for dynamic data or user- or customer-specific data that other users or customers should know or use.

The AI models register 430 can be or maintain a repository of metadata for internal and external AI models available to the AAII 400. The AI models register 430 maintains detailed information about each model, including its capabilities, performance metrics, cost parameters, availability status, and APIs or endpoints for invoking the AI models. The orchestrating agent 402 and the AI model routing engine 404 rely on this AI register to select and interact with the most appropriate models for given tasks, ensuring seamless integration and optimal alignment with task requirements.

The metadata stored in the AI models register 430 may include parameters such as the model vendor, provider, pricing details (e.g., costs for prompts, completions, or requests), supported context length, performance characteristics (e.g., latency, accuracy), and features such as vision capabilities, streaming support, and tool integration. The register also tracks the APIs or endpoints required to invoke each model, along with associated authentication credentials, query structures, and response formats. This ensures that the system can dynamically connect to and utilize both internal and external models with minimal latency or configuration overhead. Additionally, AI models may be categorized by the AI models register 430 based on their capabilities, such as classification, searching, natural language generation, or data summarization, allowing the system to route requests to models specialized for specific tasks.

For example, when the AAII 400 receives a request requiring a search operation, the AI models register 430 provides the AI model routing engine 404 with metadata identifying models optimized for searching tasks, including the appropriate API endpoints and invocation parameters. Similarly, for natural language generation tasks, the AI models register 430 can be used to ensure that required configuration details, such as supported context length and response format, are available to enable efficient routing and interaction.

In addition to AI models, the AI models register 430 may also include details necessary for integration with external systems, such as rate limits, error-handling protocols, and usage quotas for APIs. Similar registers (not shown in FIG. 4A) may exist for tools, agents, or knowledge resources, providing analogous metadata and parameters for these components.

The short-term memory 432 stores temporary session data related to active interactions, such as recent client queries, conversation history, and intermediate processing states. This enables the system to maintain context within a session, ensuring smooth transitions and continuity in multi-turn conversations or ongoing operations. For example, in a chatbot scenario, the short-term memory 432 allows the system to remember the sequence of a user's queries, such as "Hi" followed by "Where is my package?" to provide a cohesive and context-aware response.

The long-term memory 434 retains persistent data, including client profiles, historical interactions, transaction histories, and cached responses. This data is used for personalization, compliance, and context augmentation in complex tasks. For instance, if a user frequently inquires about specific services, the long-term memory 434 can be used to ensure that this pattern is remembered, enabling the AAII 400 to tailor responses and streamline interactions based on past context (e.g., behavior, responses, or interactions).

The vector database 436 stores embeddings and vector representations optimized for retrieval-augmented generation (RAG). It supports semantic searches by enabling the context engine 410 to dynamically retrieve relevant information based on similarity metrics. Customer data may be duplicated into the system through an initial import and/or frequent updates, or summarized into embeddings for efficient storage and retrieval. For example, when a user requests a summary of a contract, the vector database 436 may provide embeddings that enhance the AI-generated summary by referencing related clauses or legal terms stored in the system. This approach ensures that the system has ready access to client-specific information while optimizing storage and search operations.

In some implementations, the vector database 436 may only be used to store embeddings and vector representations of public and semi-public information for model fine-tuning. In such implementations, the vector database 436 can be used to support AI model improvement by maintaining embeddings of publicly available domain knowledge.

The configuration/objectives database 438 contains AAII 400 settings, client-defined parameters, operational objectives, routing rules, and security policies. The configuration/objectives database 438 enables specifying preferences for AI model selection, fallback strategies, and performance thresholds. For instance, a rule may be defined to prioritize cost-efficient models for routine tasks while reserving high-performance models for critical operations. Such configurations can be used by the orchestrating agent 402 and other components to align system behavior with customer requirements.

The logs 440 store telemetry data, performance metrics, and detailed operational history for system monitoring and optimization. This includes records such as model performance, task execution history, and error logs. The evaluation engine 414 uses the logs 440 to refine routing decisions and identify areas for improvement, creating a feedback loop that enhances system efficiency and reliability.

The AAII 400 may include caching mechanisms for rapid access to frequently accessed data and session stores for maintaining stateful information about ongoing interactions. Caches reduce latency by storing data from clients, internal engines, or external components, enabling quick retrieval during high-frequency operations. Session stores maintain information about ongoing interactions across multiple related tasks, ensuring smooth transitions and preserving continuity in extended workflows.

The AAII 400 may provide (e.g., include or implement) various interfaces to facilitate interaction with clients and external systems. These interfaces may include a data API, which serves as an entry point for retrieving data from client systems and may be integrated with other components like the Embedding, Context, or Security/compliance engines. Additionally, the system provides a Management API/Web UI, allowing administrators to manage and configure the intermediary, access telemetry data, statistics, logs, and other metadata. A Client API/Web UI may act as the primary entry point for clients to access the services offered by the AAII. These interfaces collectively enable seamless communication and integration between the intermediary, clients, and external resources.

Figure 4B:
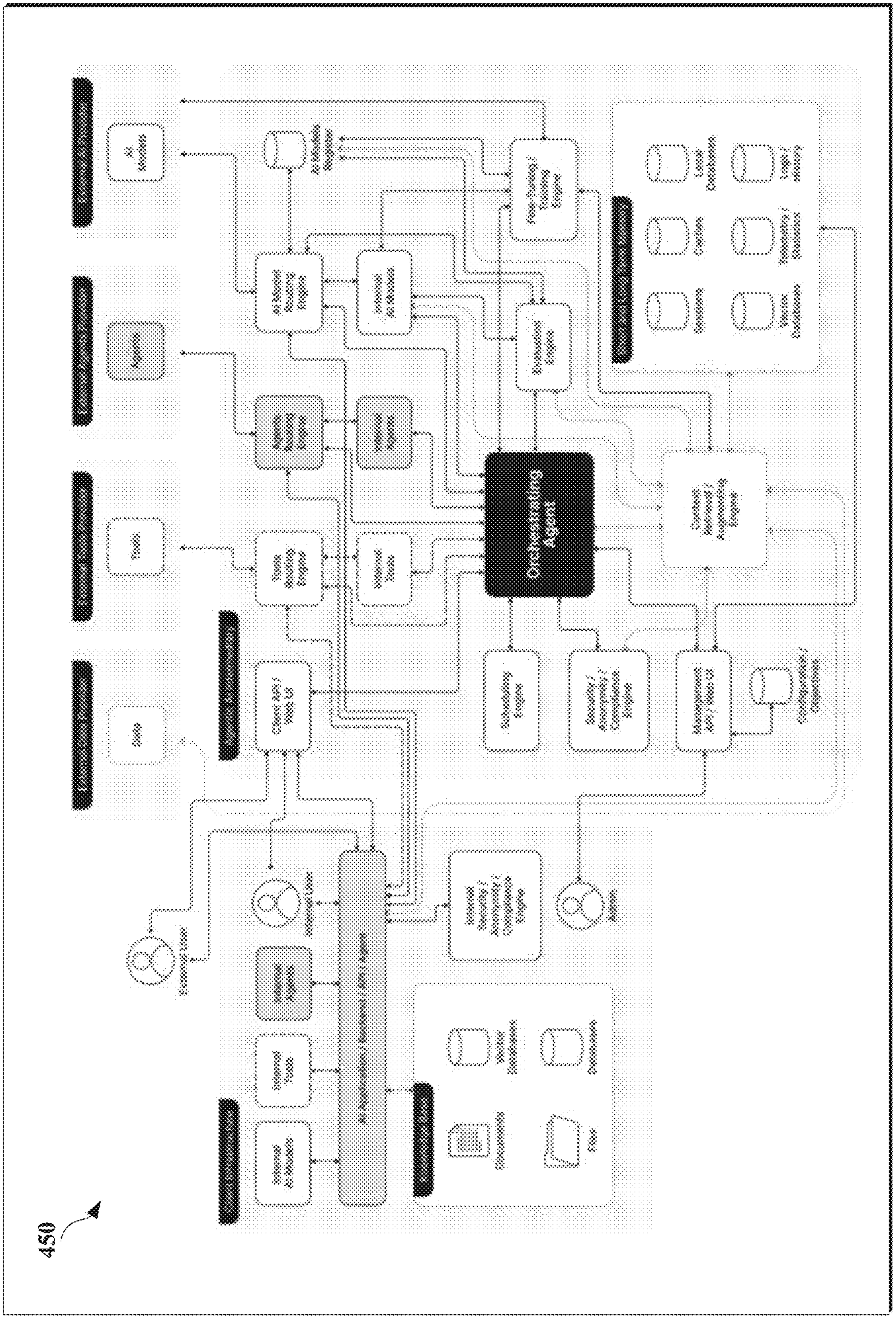
FIG. 4B illustrates a diagram of some of the interactions and data flows within the AAII of FIG. 4A.

FIG. 4B illustrates a diagram 450 of some of the interactions and data flows within the AAII 400. The diagram shows how the AAII 400 handles data/knowledge flows, tool functions, agent communications, internal system connections, and training processes. The diagram 450 highlights the role of the orchestrating agent 402 in coordinating interactions among routing engines, memory systems, and security/compliance mechanisms, while managing communications with external providers and the customer infrastructure. External users and administrators interact with the system via dedicated APIs, while internal data flows enable context enrichment, security enforcement, and the dynamic routing of requests across AI models, tools, and agents.

As detailed with respect to FIG. 4A, the AAII 400 integrates components such as routing engines, context retrieval engines, and training engines to manage interactions with internal client infrastructure, external providers, and agents. Data repositories, including short-term memory, long-term memory, and vector databases, facilitate context retrieval and aggregation. FIG. 4B further illustrates at least some of the communication pathways among components, including the orchestrating agent, management APIs, and external knowledge resources, showcasing how client-defined parameters, task objectives, and telemetry data ensure seamless integration and optimized operations across diverse systems. The specific functions and roles of the components are described in FIG. 4A.

While FIG. 4A and FIG. 4B illustrate the architecture of the Agentic AI Intermediary, there are minor variations in the terminology and logical groupings used to describe components, data stores, and engines. Some of these differences are detailed as follows to ensure clarity and facilitate understanding.

As shown in FIG. 4B, certain components are identified with consistent terminology, such as 'internal tools,' 'internal agents,' and 'internal AI models,' which appear in both the Agentic AI Intermediary and the Client Infrastructure sections of diagram 450. For clarity, the internal components illustrated within the Agentic AI Intermediary of FIG. 4B directly map to similar components described with respect to FIG. 4A, such as the internal AI models 420 and internal tools 422. Conversely, the internal components illustrated within the Client Infrastructure in FIG. 4B correspond to the components described with respect to FIG. 3, such as the internal AI models 317, internal tools 310, and internal agents 319 of the resource base 308.

As shown in FIG. 4B, the data stores for memory management within the Agentic AI Intermediary are represented under the logical grouping 'Short and Long Term Memory,' which corresponds to separate memories (e.g., the short-term memory 432 and the long-term memory 434) shown in FIG. 4A. This grouping in diagram 450 includes additional logical categories such as 'Sessions,' 'Caches,' and 'Local Databases,' which are not explicitly labeled as separate categories in FIG. 4A. The 'Vector Databases' label in FIG. 4B corresponds to the 'Vector DB' in FIG. 4A (the vector database 436), and 'Telemetry/Statistics/Logs/History' aligns with the logs 440 data store in FIG. 4A. These differences reflect varying logical groupings of data stores between the figures.

As shown in FIG. 4B, the engines within the Agentic AI Intermediary are represented with logical groupings that include 'AI Model Routing Engine,' 'Tools Routing Engine,' and 'Agent Routing Engine,' which correspond to the same engine names listed in FIG. 4A. FIG. 4B also introduces the 'Fine-Tuning/Training Engine,' which is not explicitly mentioned as a separate engine in FIG. 4A. Additionally, FIG. 4B uses 'Context Retrieval/Augmenting Engine' instead of the 'Context Engine' shown in FIG. 4A, and includes other engines such as 'Security Engine,' 'Evaluation Engine,' 'Scheduling Engine,' and 'Memory Manager,' which are listed in FIG. 4A. These differences reflect varying logical groupings or naming of engines between the figures.

Figure 4C:
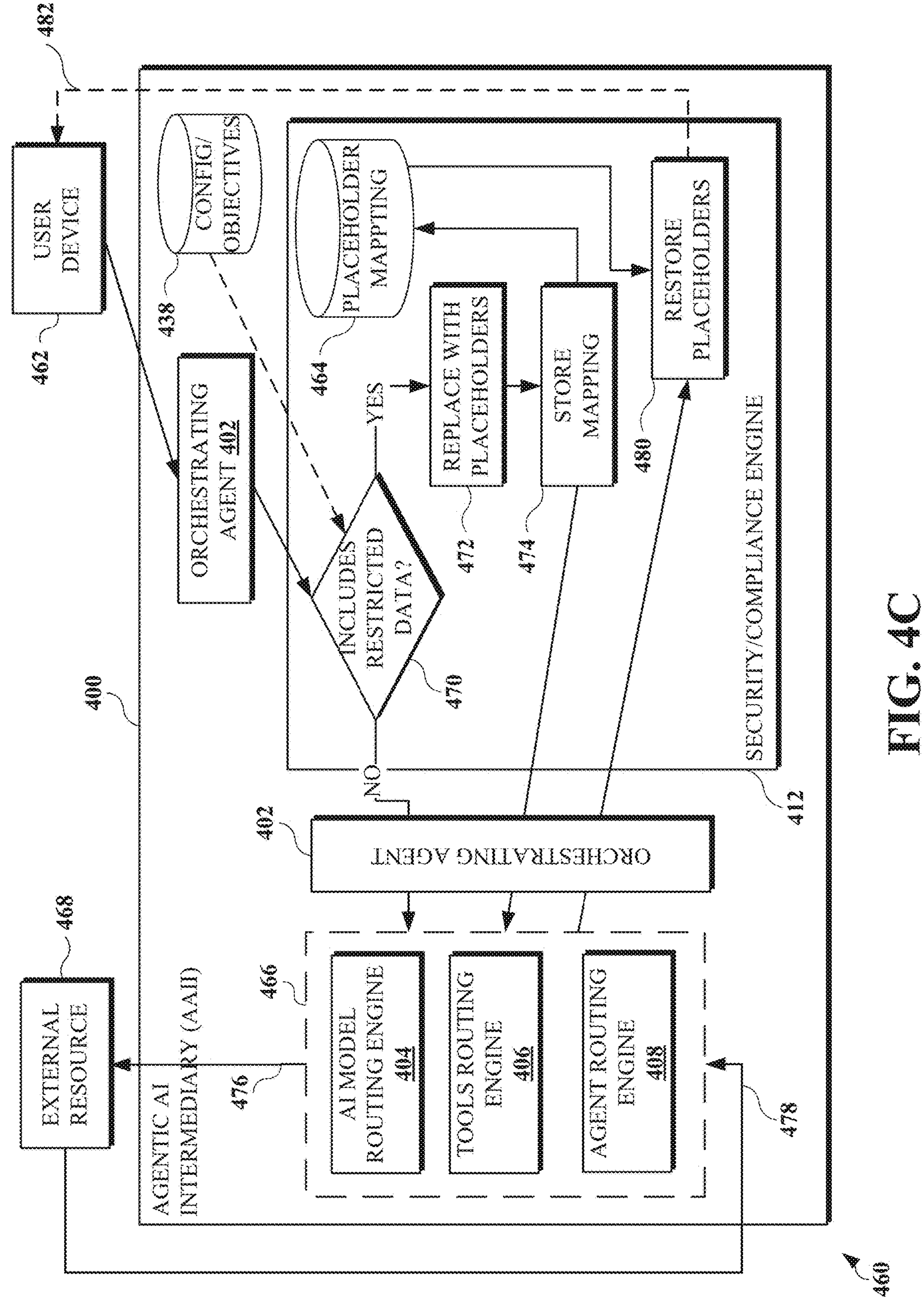
FIG. 4C is a block diagram illustrating a placeholder replacement workflow.

FIG. 4C is a block diagram illustrating a placeholder replacement workflow 460 that may be implemented by the AAII 400 of FIG. 4A and more specifically by the security/compliance engine 412. In addition to components shown in FIG. 4A, the AAII 400 is shown as including routing components 466 (which includes the AI model routing engine 404, the tools routing engine 406, and the agent routing engine 408). The security/compliance engine 412 is shown as including a placeholder mapping data store 464. FIG. 4C further illustrates a user device 462 and an external resource 468.

The AAII 400 may be configured to receive requests from the user device 462, process the requests through the security/compliance engine 412 to identify and replace restricted data with placeholders, route sanitized requests to appropriate external resources, receive placeholder responses, restore original data by replacing placeholders, and transmit restored responses back to the user device 462. As used herein, "restricted data" refers to information that has been designated as requiring protection, anonymization, or restricted access based on guardrails rules, including personally identifiable information (PII), financial data, proprietary business information, confidential organizational data, or content that violates organizational policies or legal compliance requirements.

In some implementations, the AAII 400 may be implemented as a cloud-based service, an on-premises installation within a client infrastructure, or a hybrid deployment combining both approaches. For example, the security/compliance engine 412 may be deployed within a client infrastructure to process sensitive data locally before transmitting sanitized requests to cloud-based components of the AAII 400.

The orchestrating agent 402 may be configured to coordinate the flow of requests and responses through the security/compliance engine 412 and the routing components 466. The orchestrating agent 402 may receive requests from the user device 462, direct the requests to the security/compliance engine 412 for processing, coordinate the transmission of sanitized requests to the external resource 468 via the routing components 466, receive placeholder responses from the external resource 468, direct the placeholder responses to the security/compliance engine 412 for placeholder restoration, and transmit restored responses back to the user device 462. In some implementations, the orchestrating agent 402 may be configured to access guardrails rules from the configuration/objectives database 438 to determine how the security/compliance engine 412 processes requests. Guardrails rules, as used herein, refer to configurable policies and criteria that define what types of data are restricted, what content or behaviors are prohibited, how restricted data should be processed (through anonymization, blocking, or other measures), and what actions should be triggered when violations are detected, such as notifications to security information and event management (SIEM) systems.

The orchestrating agent 402 may retrieve client-defined parameters from the configuration/objectives database 438 to guide security policy enforcement, anonymization strategies, and routing decisions based on data sensitivity classifications. The orchestrating agent 402 may be configured to log telemetry data regarding security processing operations, including the detection of restricted data, the application of placeholder replacements, and the restoration of original data. In some implementations, the security/compliance engine 412 may be configured to perform these logging and telemetry functions directly, either independently or in coordination with the orchestrating agent 402.

The orchestrating agent 402 may be configured to trigger notifications to security information and event management (SIEM) systems when guardrails violations are detected. For example, the orchestrating agent 402 may transmit an alert to a SIEM system when a request contains restricted data that violates organizational policies, such as attempts to access prohibited content or exfiltrate confidential information.

The routing components 466 may be configured to collectively select and invoke appropriate external resources to process requests. The routing components 466 serve as a convenient reference to the AI model routing engine 404, the tools routing engine 406, and the agent routing engine 408, which function together to route requests to external AI models, tools, and agents based on task requirements, performance criteria, and security constraints. The routing components 466 may receive sanitized requests from the security/compliance engine 412 and determine which external resource 468 is optimal for processing each request based on factors including task complexity, cost considerations, real-time availability, and data sensitivity requirements.

In some implementations, the routing components 466 may be configured to apply additional routing restrictions when the security/compliance engine 412 identifies restricted data in a request, limiting the selection of external resources to those that comply with organizational security policies and data privacy regulations. The routing components 466 may be configured to route requests exclusively to trusted external resources when the requests contain data that has been sanitized through placeholder replacement. For example, when a request includes financial information that has been replaced with placeholders, the routing components 466 may route the sanitized request only to external AI models that are designated as approved for processing anonymized financial data.

The routing components 466 may be configured to operate in coordination with the security/compliance engine 412 to determine whether sanitized requests may be transmitted to external resources or whether requests containing restricted data that cannot be sanitized should be blocked entirely.

In some implementations, the routing components 466 may receive guidance from the configuration/objectives database 438 regarding which external resources are authorized to receive sanitized requests and which external resources are prohibited from receiving any requests containing restricted data, regardless of anonymization efforts.

The security/compliance engine 412 may be configured to identify restricted data in requests, replace restricted data with placeholders to generate sanitized requests, store mappings between original restricted data and placeholders, restore original data by replacing placeholders in responses with the original restricted data values, and transmit restored responses to the user device 462. The security/compliance engine 412 may implement guardrails rules that define what types of data are restricted, including personally identifiable information (PII), financial data, proprietary business information, partner or client names, and content that violates organizational policies.

The security/compliance engine 412 may be configured to apply guardrails rules through multiple implementation mechanisms, including static pattern-matching rules such as regular expressions, small self-hosted AI models (e.g., one or more SLMs) trained to detect sensitive content, or configurable subsystems that apply client-defined security policies. In some implementations, the security/compliance engine 412 may be deployed within a client infrastructure to process restricted data locally before any information is transmitted to the AAII 400. For example, a healthcare organization may deploy the security/compliance engine 412 within its secure network to anonymize protected health information (PHI) in requests before transmitting sanitized requests to external AI models hosted by the AAII 400.

The security/compliance engine 412 may be configured to retrieve guardrails rules from the configuration/objectives database 438, which may specify categories of restricted data including names, addresses, identification numbers, credit card information, account numbers, salary information, trade secrets, strategic plans, merger and acquisition details, and any other data designated as confidential by the organization. The guardrails rules may further define content that is restricted based on organizational policies or legal compliance requirements, including content related to weapons, controlled substances, adult material, unauthorized system access, or any topics deemed inappropriate for workplace AI interactions.

The security/compliance engine 412 may be configured to apply different anonymization strategies based on the type of restricted data detected, such as replacing specific names with generic placeholders like "PERSON_A" or "COMPANY_X," redacting numerical identifiers entirely, or adding statistical noise to numerical data to obscure exact values while preserving aggregate statistical properties. The security/compliance engine 412 may be configured to determine whether restricted data can be successfully replaced with placeholders while preserving the logical structure of the request, recognizing that in many cases the semantic meaning may not be fully preserved when actual data values are essential to fulfilling the request.

For example, when a request seeks to generate a personalized document such as "Draft a welcome letter for John Smith who will be joining Acme Corporation as Senior Manager on Jan. 15, 2025," the security/compliance engine 412 may replace "John Smith" with "PERSON_A," "Acme Corporation" with "COMPANY_X," "Senior Manager" with "ROLE_Y," and "Jan. 15, 2025" with "DATE_Z" to generate the sanitized request "Draft a welcome letter for PERSON_A who will be joining COMPANY_X as ROLE_Y on DATE_Z," while maintaining the logical structure of the request. When the external resource generates a welcome letter template containing these placeholders, the placeholder restoration process replaces PERSON_A with "John Smith," COMPANY_X with "Acme Corporation," ROLE_Y with "Senior Manager," and DATE_Z with "Jan. 15, 2025" to produce the final personalized document.

The security/compliance engine 412 may be configured to log telemetry data regarding security processing operations to a logs data store for visibility, auditing, and compliance purposes. The telemetry data may include records of when restricted data was detected, what types of restricted data were identified, which guardrails rules were triggered, how many placeholders were generated, whether sanitization was successful, and whether requests were blocked due to guardrails violations. In some implementations, the security/compliance engine 412 may be configured to transmit telemetry data to external SIEM systems to enable real-time security monitoring and threat detection across AI usage of the organization.

The security/compliance engine 412 may be configured to determine whether to return detailed error explanations or abstract error messages when requests are blocked, thereby balancing the need to guide users with the risk of revealing sensitive information about guardrails logic or system prompts. For example, when a request is blocked because it attempts to access prohibited content, the security/compliance engine 412 may return a generic error message stating "This request cannot be processed due to policy restrictions" rather than specifying which particular guardrails rule was violated, thereby preventing users from inferring details about the security implementation. In some implementations, when the security risk is minimal and user guidance is beneficial, the security/compliance engine 412 may return a detailed error explanation such as "This request has been blocked because it contains personally identifiable information (PII) that cannot be processed by external AI models under organizational policy #SEC-2024-05. Please remove names, addresses, and identification numbers from your request and try again."

A placeholder mapping data store 464 may be implemented as a secure in-memory database for rapid access during active sessions, while the sensitive data determination step (at 470) may be implemented as a dedicated microservice that evaluates requests against guardrails rules retrieved from the configuration/objectives database 438.

The placeholder mapping data store 464 may be configured to store bidirectional mappings between original restricted data values and unique placeholder identifiers. The placeholder mapping data store 464 may maintain pairs of data elements, where each pair associates an original restricted data value with a corresponding placeholder that was substituted in its place during the placeholder replacement step 472. The placeholder mapping data store 464 may be configured to enable the placeholder restoration step (at 480) to retrieve the original restricted data values and replace placeholders in responses with the original values, thereby generating restored responses that contain the actual data requested by the user device 462.

The placeholder mapping data store 464 may be implemented as a secure data structure that stores mappings only for the duration of a request-response cycle and deletes the mappings after the restored response is transmitted to the user device 462. The placeholder mapping data store 464 may be implemented as an encrypted database that persists mappings across multiple related requests within a session, enabling context maintenance for multi-turn conversations while protecting the confidentiality of restricted data. For example, in a customer service chatbot scenario where a user asks multiple questions about their account, the placeholder mapping data store 464 may retain the mapping between the user's actual name and the placeholder "PERSON_A" throughout the conversation session, enabling consistent placeholder usage across multiple request-response cycles.

The placeholder mapping data store 464 may be configured to generate unique placeholders that preserve semantic relationships and data types while obscuring actual values. The placeholder mapping data store 464 may assign placeholders that indicate the category of restricted data being replaced, such as "NAME_1," "NAME_2" for different person names, "COMPANY_A," "COMPANY_B" for organization names, "ACCOUNT_X," "ACCOUNT_Y" for account identifiers, or "ADDRESS_1," "ADDRESS_2" for location information. In some implementations, the placeholder mapping data store 464 may be configured to ensure that each unique restricted data value is consistently mapped to the same placeholder within a given session or request-response cycle, such that multiple occurrences of the same name are replaced with the same placeholder identifier.

The placeholder mapping data store 464 may be implemented with access controls that restrict which components of the AAII 400 can read or write mapping entries, such that only the security/compliance engine 412 has permission to create and retrieve mappings. For example, the placeholder mapping data store 464 may be implemented with encryption at rest and in transit, with decryption keys held only by the security/compliance engine 412, such that even if the routing components 466 or external resource 468 were compromised, the mappings between placeholders and original restricted data would remain protected.

At 470, the security/compliance engine 412 determines whether the request received from the user device 462 includes restricted data. The sensitive data determination step 470 may be configured to analyze incoming requests to identify content that matches guardrails rules defining restricted data categories, including guardrails-restricted content such as personally identifiable information, financial data, proprietary business information, or content that violates organizational policies. The sensitive data determination step 470 may apply pattern-matching techniques, natural language processing algorithms, machine learning models, or rule-based evaluation systems to detect the presence of restricted data within request text, attached files, or other input modalities.

The sensitive data determination step 470 may be implemented using static rules such as regular expressions that match patterns indicative of restricted data, including patterns for social security numbers, credit card numbers, email addresses, phone numbers, or other structured identifiers. In some implementations, the sensitive data determination step (at 470) may be implemented using one or more SLMs that evaluate requests against configured prompts to determine whether the requests contain sensitive information or express intentions that violate organizational policies. For example, the sensitive data determination step 470 may employ an AI model with a prompt such as "Analyze the following text and determine whether it contains personally identifiable information, financial data, or requests for prohibited activities" to evaluate each incoming request.

When the security/compliance engine 412 determines that the request does not include restricted data, the request is transmitted (such as via the orchestrating agent 402) directly to the routing components 466 without modification. The sensitive data determination step (at 470) may generate a determination result indicating that the request is compliant with guardrails rules and may be processed without anonymization or placeholder replacement. The unmodified request may be transmitted to the AI model routing engine 404, the tools routing engine 406, or the agent routing engine 408 for routing to an appropriate external resource 468.

The sensitive data determination step (at 470) may be configured to log the determination result to a telemetry system for auditing purposes, recording that the request was evaluated and found to contain no restricted data. In some implementations, the sensitive data determination step may be configured to cache determination results for identical or substantially similar requests to reduce processing latency for frequently submitted requests. For example, when multiple users submit the same general knowledge query such as "What is the capital of France?" the sensitive data determination step 470 may cache the result that this request contains no restricted data, enabling subsequent identical requests to bypass the determination analysis and proceed directly to routing.

When the security/compliance engine 412 determines that the request includes restricted data, the request is directed to the placeholder replacement step (at 472) for anonymization processing. The sensitive data determination step may generate a determination result that identifies the specific instances of restricted data detected in the request, including the type of restricted data, the location of each instance within the request, and the guardrails rule that was triggered. The sensitive data determination step (at 470) may further determine whether the restricted data can be successfully replaced with placeholders while preserving the logical structure of the request, or whether the request should be blocked entirely because anonymization would render the request nonsensical or would violate organizational policies regardless of anonymization.

The sensitive data determination step 470 may be configured to evaluate whether the logical structure of the request can be maintained with placeholder-substituted data, recognizing that the fulfillment of certain requests requires access to actual restricted data values and cannot be successfully completed using placeholders alone. For example, a request such as "What is the current salary of John Smith?" would require the external resource to query an employee database using the actual employee name. The sensitive data determination step 470 may determine that such requests should be routed to internal resources that have authorized access to employee data, or should be processed through a different workflow where the AAII 400 itself retrieves the data from internal systems using the actual restricted data values, and then sanitizes the response before transmitting it to the external resource for further processing such as formatting or summarization. In contrast, requests such as "What is John Smith's home address?" may be blocked entirely if organizational policy prohibits AI systems from accessing address information under any circumstances. In some implementations, the sensitive data determination step may be configured to trigger notifications to SIEM systems when restricted data is detected, particularly when the restricted data indicates potential policy violations, security risks, or compliance concerns.

At 472, the security/compliance engine 412 replaces restricted data with placeholders. The placeholder replacement step 472 may be configured to substitute each instance of restricted data identified at the sensitive data determination step (at 470) with a unique placeholder identifier, thereby generating a sanitized request that preserves the logical structure of the original request while obscuring actual restricted data values. The placeholder replacement step 472 may generate placeholders that indicate the category or type of data being replaced, such as "PERSON_A"

for a person's name, "COMPANY_X" for an organization name, "ACCOUNT_123" for an account number, or "AMOUNT_Y" for a financial value.

The placeholder replacement step 472 may be configured to maintain consistency in placeholder assignments such that multiple occurrences of the same restricted data value within a single request are replaced with the same placeholder identifier. The placeholder replacement step (at 472) may be configured to apply different replacement strategies based on the type of restricted data detected, including full replacement where the entire data value is substituted with a placeholder, partial redaction where only sensitive portions of the data are obscured, or generalization where specific values are replaced with broader category descriptors.

For example, when processing a request containing "John Smith, employee at Acme Corporation, earned $125,000 in 2024," the placeholder replacement step 472 may evaluate whether the monetary amount requires sanitization based on the context and relationships among the restricted data elements. When the request identifies only a generic employee role, retaining the salary amount may be acceptable because the link between the individual and the compensation is obscured by the placeholder. However, when processing a request containing "John Smith, the CEO of Acme Corporation, earned $125,000 in 2024," the placeholder replacement step 472 may determine that the monetary amount should also be sanitized because the unique role (CEO) combined with the organization name could enable re-identification of the individual even when the name is replaced with a placeholder. The placeholder replacement step 472 may generate the sanitized request "PERSON_A, employee at COMPANY_X, earned AMOUNT_Y in 2024," or "PERSON_A, ROLE_Z at COMPANY_X, earned AMOUNT_Y in 2024," preserving the grammatical structure and semantic relationships while obscuring all restricted data values that could enable re-identification of individuals.

At 474, the security/compliance engine 412 stores mappings between the original restricted data values and the placeholders generated at the placeholder replacement step. The mapping storage step (at 474) may be configured to create bidirectional association records in the placeholder mapping data store 464, where each record pairs an original restricted data value with its corresponding placeholder identifier. The mapping storage step (at 474) may generate mapping entries that enable subsequent placeholder restoration, such that when a placeholder response is received from the external resource 468, the placeholder restoration step (at 480) can retrieve the original restricted data values and regenerate the actual information requested by the user device 462.

The mapping storage step (at 474) may be configured to assign expiration times to mapping entries, such that mappings are automatically deleted after a specified duration or after the restored response is transmitted to the user device 462, thereby minimizing the window during which sensitive mapping data exists in storage. The mapping storage step (at 474) may be configured to encrypt mapping entries before storing them in the placeholder mapping data store 464, such that the mappings remain confidential even if unauthorized access to the data store is obtained. The mapping storage step (at 474) may apply encryption using keys that are held exclusively by the security/compliance engine 412 and are not accessible to other components of the AAII 400, such that the routing components 466 and external resource 468 cannot decrypt the mappings even if they gain access to the placeholder mapping data store 464.

At 476, the AAII 400 transmits the sanitized request to the external resource 468. The request transmission step (at 476) may be configured to forward the sanitized request generated by the placeholder replacement step through the routing components 466 to an appropriate external resource 468 for processing. The sanitized request transmitted at the request transmission step (at 476) contains placeholders in place of restricted data, such that the external resource 468 processes an anonymized version of the original request without access to the actual restricted data values.

In some implementations, the request transmission step (at 476) may be configured to append metadata to the sanitized request indicating that the request has been processed through security/compliance anonymization, enabling the external resource 468 to apply appropriate handling procedures for sanitized requests. In some implementations, the request transmission step (at 476) may be configured to route sanitized requests exclusively to external resources that have been designated as approved for processing anonymized data, as specified in guardrails rules retrieved from the configuration/objectives database 438.

For example, when the original request contains financial information that has been replaced with placeholders, the request transmission step (at 476) may route the sanitized request only to external AI models that comply with financial data protection regulations and have been approved by the organization for processing anonymized financial queries.

At 478, the AAII 400 receives a placeholder response from the external resource 468. The response reception step (at 478) may be configured to obtain a response generated by the external resource 468 based on processing the sanitized request transmitted at the request transmission step 476. The placeholder response received at the response reception step includes placeholders rather than actual restricted data values, because the external resource 468 processed a sanitized request containing placeholders and therefore generated a response that references those same placeholders.

The response reception step (at 478) may be configured to validate that the placeholder response contains only the placeholders that were present in the sanitized request, detecting any anomalies where the external resource 468 may have introduced unexpected placeholders or modified existing placeholder identifiers. In some implementations, the response reception step may be configured to forward the placeholder response to the placeholder restoration step (at 480) for processing. For example, when the sanitized request asked "Draft a welcome letter for PERSON_A who will be joining COMPANY_X as ROLE_Y on DATE_Z," the placeholder response received at the response reception step 478 may contain a letter template stating "Dear PERSON_A, we are pleased to welcome you to COMPANY_X in your new role as ROLE_Y beginning DATE_Z," which contains the placeholders PERSON_A, COMPANY_X, ROLE_Y, and DATE_Z rather than actual names, organization identifiers, roles, and dates.

At 480, the security/compliance engine 412 restores placeholders in the response by replacing them with the original restricted data values. The placeholder restoration step (at 480) may be configured to retrieve mapping entries from the placeholder mapping data store 464 and substitute each placeholder identifier in the placeholder response with its corresponding original restricted data value, thereby generating a restored response that contains the actual information requested by the user device 462. The placeholder restoration step may identify each placeholder present in the placeholder response, query the placeholder mapping data store 464 to obtain the original restricted data value associated with that placeholder, and replace the placeholder with the original value.

The placeholder restoration step (at 480) may be configured to validate that every placeholder in the placeholder response has a corresponding mapping entry in the placeholder mapping data store 464, detecting any inconsistencies where the external resource 468 may have generated responses containing placeholders that were not present in the sanitized request. The placeholder restoration step (at 480) may be configured to delete or invalidate mapping entries from the placeholder mapping data store 464 after the restored response is generated, such that the mappings between placeholders and original restricted data values are not retained longer than necessary.

For example, when the placeholder response contains "Dear PERSON_A, we are pleased to welcome you to COMPANY_X in your new role as ROLE_Y beginning DATE_Z," the placeholder restoration step (at 480) retrieves the mappings indicating that PERSON_A corresponds to "John Smith," COMPANY_X corresponds to "Acme Corporation," ROLE_Y corresponds to "Senior Manager," and DATE_Z corresponds to "Jan. 15, 2025," and generates the restored response "Dear John Smith, we are pleased to welcome you to Acme Corporation in your new role as Senior Manager beginning Jan. 15, 2025."

At 482, the AAII 400 transmits the restored response to the user device 462. The restored response transmission step (at 482) may be configured to forward the restored response generated by the placeholder restoration step (at 480) to the user device 462 through the orchestrating agent 402. The restored response transmitted at the restored response transmission step 482 contains the actual restricted data values requested by the user device 462, reconstructed by replacing placeholders with original data from the placeholder mapping data store 464.

The restored response transmission step (at 482) may be configured to apply additional security measures to the transmission channel between the AAII 400 and the user device 462, including encryption, authentication, and access controls to protect the confidentiality of the restored response during transit. The restored response transmission step may be configured to log telemetry data regarding the successful completion of the placeholder replacement workflow, recording that restricted data was detected, replaced with placeholders, processed by an external resource in sanitized form, and successfully restored before transmission to the user device 462.

For example, the restored response transmission step may record metrics including the number of placeholders that were replaced, the types of restricted data that were anonymized, the external resource that processed the sanitized request, and the total processing time required for the complete placeholder replacement workflow.

The configuration/objectives database 438 may be configured to store guardrails rules that define categories of restricted data, specify anonymization strategies, identify approved external resources for processing sanitized requests, and establish organizational policies for AI system usage. The configuration/objectives database 438 may be accessed by the security/compliance engine 412 to retrieve guardrails rules during the sensitive data determination step 470, by the routing components 466 to determine routing restrictions based on data sensitivity, and by the orchestrating agent 402 to coordinate security processing operations.

In some implementations, the configuration/objectives database 438 may be configured to store multiple rule sets corresponding to different organizational departments, user roles, or data classification levels, enabling the security/compliance engine 412 to apply different guardrails rules based on the source of the request or the context of the user session. For example, the configuration/objectives database 438 may store a first set of guardrails rules for customer service interactions that permits limited access to customer account information with placeholder replacement, and a second set of guardrails rules for general employee queries that blocks all access to customer account information regardless of anonymization.

The external resource 468 may be configured to represent one or more external AI models, tools, or agents that process requests transmitted by the agentic AI intermediary (AAII) 400. The external resource 468 serves as a convenient reference to external AI models such as the external AI models 320 shown in FIG. 3, external tools such as the external tools 322 shown in FIG. 3, or external agents such as the external agents 324 shown in FIG. 3. The external resource 468 may receive sanitized requests from the routing components 466, process the sanitized requests according to its capabilities, and generate placeholder responses that are returned to the AAII 400.

Figure 4D:
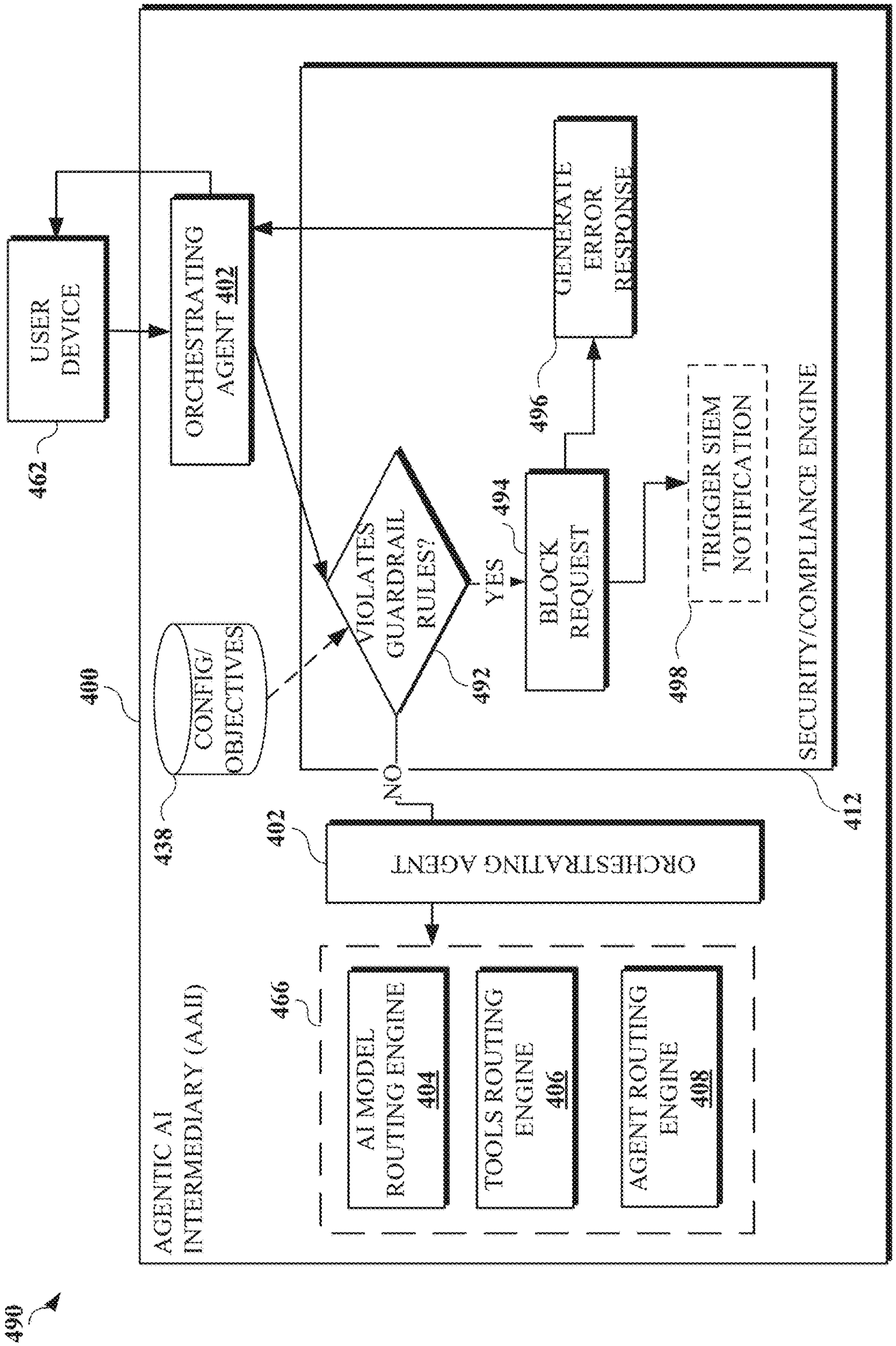
FIG. 4D is a block diagram illustrating a guardrails blocking workflow.

FIG. 4D is a block diagram illustrating a guardrails blocking workflow 490 that may be implemented by the AAII 400 of FIG. 4A and more specifically by the security/compliance engine 412.

Administrators may configure guardrails rules through a Management API/Web UI to define what types of requests should be blocked entirely rather than processed through placeholder replacement. The guardrails rules may specify prohibited content categories such as requests for information about weapons, explosives, controlled substances, adult material, hacking techniques, or other topics designated as inappropriate for workplace AI interactions. The guardrails rules may define policy violations such as requests attempting to access data outside an authorization level of the user, requests indicating exfiltration of confidential business information, requests unrelated to legitimate work purposes, or requests that violate industry-specific regulations. The guardrails rules may establish blocking criteria based on risk assessments, such as requests that could enable social engineering attacks, requests attempting to probe system capabilities or limitations, or requests exhibiting patterns associated with malicious intent. For example, a financial services organization may configure guardrails rules that block any requests seeking methods to circumvent anti-money laundering controls, while a healthcare organization may configure guardrails rules that block requests attempting to access patient records without proper authorization credentials.

The AAII 400 may be configured to receive requests from the user device 462, evaluate the requests through the security/compliance engine 412 to determine whether the requests violate guardrails rules, block requests that violate guardrails rules, generate error responses for blocked requests, optionally trigger notifications to SIEM systems, and transmit error responses back to the user device 462. When the security/compliance engine 412 determines that a request does not violate guardrails rules, the request may be processed as described with respect to FIG. 4C, including potential placeholder replacement if restricted data is detected that can be safely anonymized.

At 492, the security/compliance engine 412 determines whether the request received from the user device 462 violates guardrails rules. The guardrails violation determination step (at 492) may be configured to evaluate requests against guardrails rules retrieved from the configuration/objectives database 438 to identify violations that warrant blocking the request entirely rather than processing it through placeholder replacement, as described with respect to FIG. 4C. The guardrails violation determination step (at 492) may identify violations including requests for prohibited content such as information that has been designated as prohibited based on organizational policies, legal requirements, or security considerations, including weapons information, controlled substances, adult material, or unauthorized system access; requests that would violate organizational policies regardless of anonymization; requests attempting to exfiltrate confidential data; requests containing restricted data that cannot be meaningfully processed through placeholder replacement; or requests that pose security risks or compliance concerns.

The guardrails violation determination step (at 492) may apply multiple evaluation techniques to detect violations, including pattern-matching algorithms that identify prohibited keywords or phrases, natural language processing models that analyze request intent and context, rule-based systems that evaluate requests against explicit policy criteria, or machine learning models trained to recognize requests that violate organizational standards. The guardrails violation determination step (at 492) may be implemented using one or more SLMs configured with prompts that include the applicable guardrails rules as context, such as "Given the following organizational policies: [list of guardrails rules], analyze the following request and determine whether it seeks prohibited information, violates workplace policies, or poses security risks." The SLM receives both the user request and the relevant guardrails rules as inputs, enabling it to evaluate whether the request violates any of the specified policies. For example, when evaluating a request about controlled substances, the SLM may be provided with guardrails rules stating "Block all requests seeking information about illegal drugs, drug manufacturing processes, or methods to obtain controlled substances without valid prescriptions" alongside the user's request, enabling the SLM to determine whether the request violates these policies.

In some implementations, the security/compliance engine 412 may be configured to evaluate requests for guardrails violations before performing any placeholder replacement operations, such that requests violating organizational policies are blocked immediately without expending computational resources on anonymization processing. This approach prioritizes security by preventing prohibited requests from progressing through any system workflows, regardless of whether the requests contain restricted data. In some implementations, the security/compliance engine 412 may be configured to perform placeholder replacement before evaluating guardrails violations, such that the violation determination process analyzes sanitized versions of requests rather than original requests containing restricted data. This approach may be appropriate when guardrails rules are implemented using external AI models or services that should not receive unsanitized restricted data, even for the purpose of violation detection. For example, when an organization uses a third-party content moderation service to evaluate requests for policy violations, the security/compliance engine 412 may first replace restricted data with placeholders to prevent exposing confidential information to the external service, and then transmit the sanitized request to the content moderation service for guardrails evaluation.

When the security/compliance engine 412 determines that the request does not violate guardrails rules, the request may be processed as described with respect to FIG. 4C. The guardrails violation determination step (at 492) may generate a determination result indicating that the request is compliant with organizational policies and may proceed to the sensitive data determination step (at 470 of FIG. 4C) to evaluate whether the request contains restricted data requiring placeholder replacement. The orchestrating agent 402 may direct compliant requests to the routing components 466 for transmission to appropriate external resources, either directly if no restricted data is present or after sanitization through placeholder replacement if restricted data is detected.

At 494, when the security/compliance engine 412 determines that the request violates guardrails rules, the request is blocked. The block request step (at 494) may be configured to terminate processing of the request, preventing the request from reaching the routing components 466 or any external resources. The block request step (at 494) may halt all further operations related to the request, including preventing any placeholder replacement operations, routing decisions, or transmissions to external AI models, tools, or agents. The block request step (at 494) may generate a blocking record that identifies the type of violation detected, the specific guardrails rule that was triggered, and metadata about the blocked request for logging and auditing purposes.

The block request step (at 494) may be configured to determine the severity of the violation to guide subsequent actions including error response generation and SIEM notification decisions. The block request step (at 494) may classify violations into severity levels such as low-severity violations that represent minor policy infractions, medium-severity violations that indicate potential security concerns or compliance issues, or high-severity violations that suggest malicious intent, data exfiltration attempts, or serious policy breaches. For example, a request asking for information about office pranks may be classified as a low-severity violation of workplace appropriateness policies, while a request attempting to extract all employee salary data may be classified as a high-severity violation indicating potential data theft.

At 496, the security/compliance engine 412 generates an error response for the blocked request. The generate error response step (at 496) may be configured to create an error message that informs the user device 462 that the request cannot be processed while balancing transparency with security considerations. The generate error response step (at 496) may select between detailed error explanations that specify the nature of the violation and guidance for submitting compliant requests, or abstract error messages that provide minimal information to prevent users from inferring details about guardrails implementation. The level of detail provided in error responses may be determined based on violation severity, user role, organizational policies, or security risk assessments.

For example, when a low-severity violation occurs and providing guidance would benefit users without compromising security, the generate error response step (at 496) may return a detailed error message such as "This request has been blocked because it asks for information about controlled substances, which violates organizational policy #CONDUCT-2024-12. Please submit requests related to your work responsibilities." When a high-severity violation occurs that may indicate malicious intent, the generate error response step 496 may return an abstract error message such as "This request cannot be processed" without revealing which guardrails rule was violated or what specific content triggered the block, thereby preventing potential attackers from probing system defenses thereby preventing potential attackers from probing system defenses.

By withholding specific violation details, the security/compliance engine 412 may prevent adversaries from systematically testing guardrails boundaries to map the security implementation. For example, if detailed error messages revealed that requests mentioning "explosives" triggered blocks while requests mentioning "firearms" did not, an attacker could iteratively probe the system to identify gaps in coverage or discover which specific terms and patterns are monitored. The abstract error approach treats guardrails logic as security-sensitive intellectual property that, if exposed, could be circumvented or exploited.

At 498, the security/compliance engine 412 may optionally trigger a SIEM notification. The trigger SIEM notification step (at 498) may be configured to transmit alerts to SIEM systems when blocked requests meet criteria warranting security monitoring or incident response. The trigger SIEM notification step (at 498) may evaluate whether a blocked request should generate a SIEM alert based on factors including violation severity, detection of potential malicious intent, patterns of repeated violations by the same user, requests attempting to access highly sensitive data, or violations of regulatory compliance requirements. The SIEM notifications may include details such as the user identity, timestamp, request content, violated guardrails rule, violation severity classification, and recommended response actions.

The trigger SIEM notification step (at 498) may be configured to aggregate multiple low-severity violations from the same user over time to detect patterns that may indicate reconnaissance activities, social engineering attempts, or gradual policy boundary testing. For example, when a user submits multiple requests over several days that each individually represent minor policy violations but collectively suggest an attempt to probe system capabilities or extract sensitive information through incremental queries, the trigger SIEM notification step (at 498) may generate an alert to security personnel for investigation. The orchestrating agent 402 may coordinate the transmission of error responses to the user device 462 and SIEM notifications to external security systems, while logging all blocking events to the logs 440 for compliance auditing and security analysis.

Figure 5:
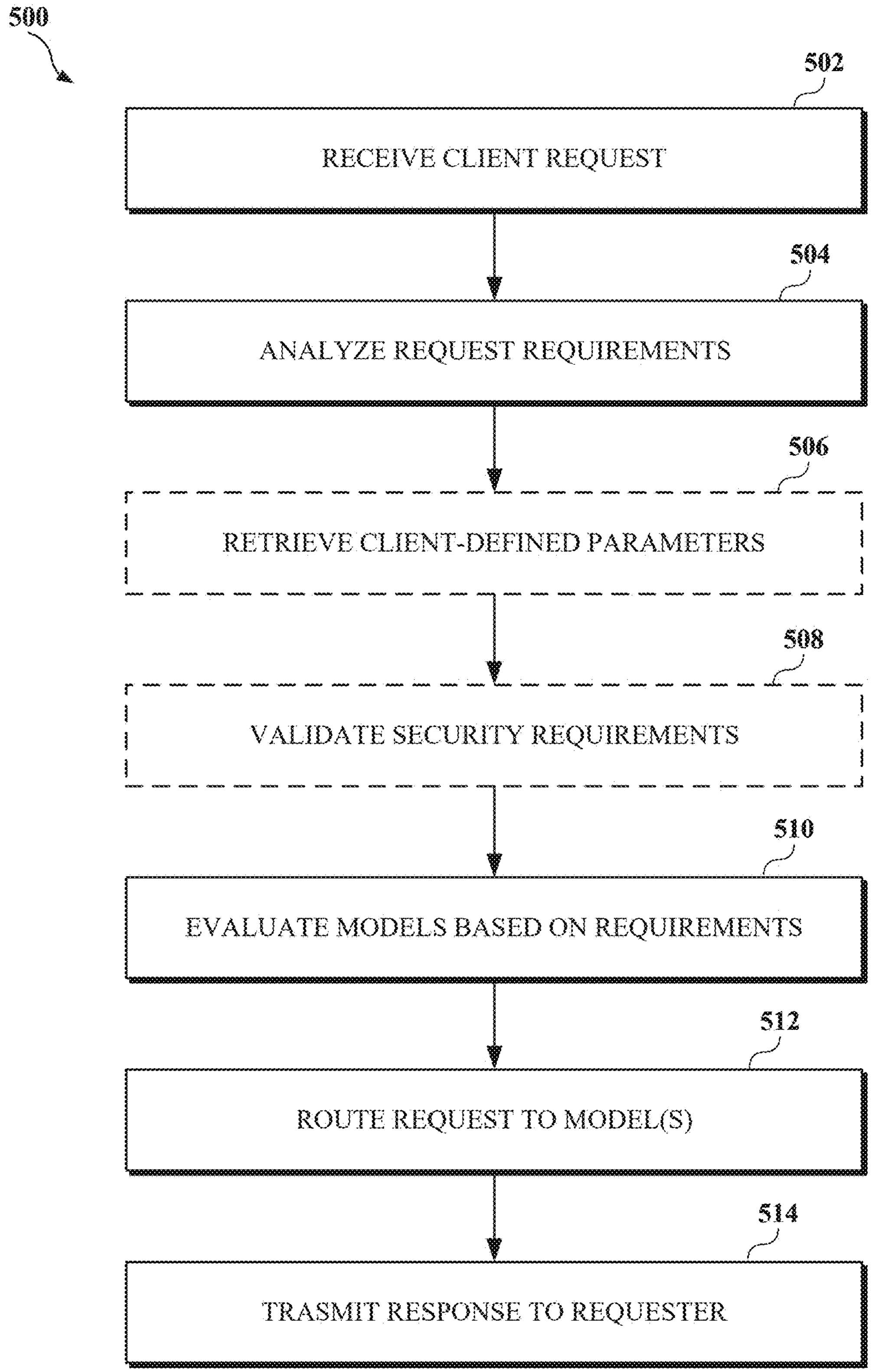
FIG. 5 is a flowchart of a technique for dynamically selecting and invoking an optimal AI model to process client requests.
Figure 6:
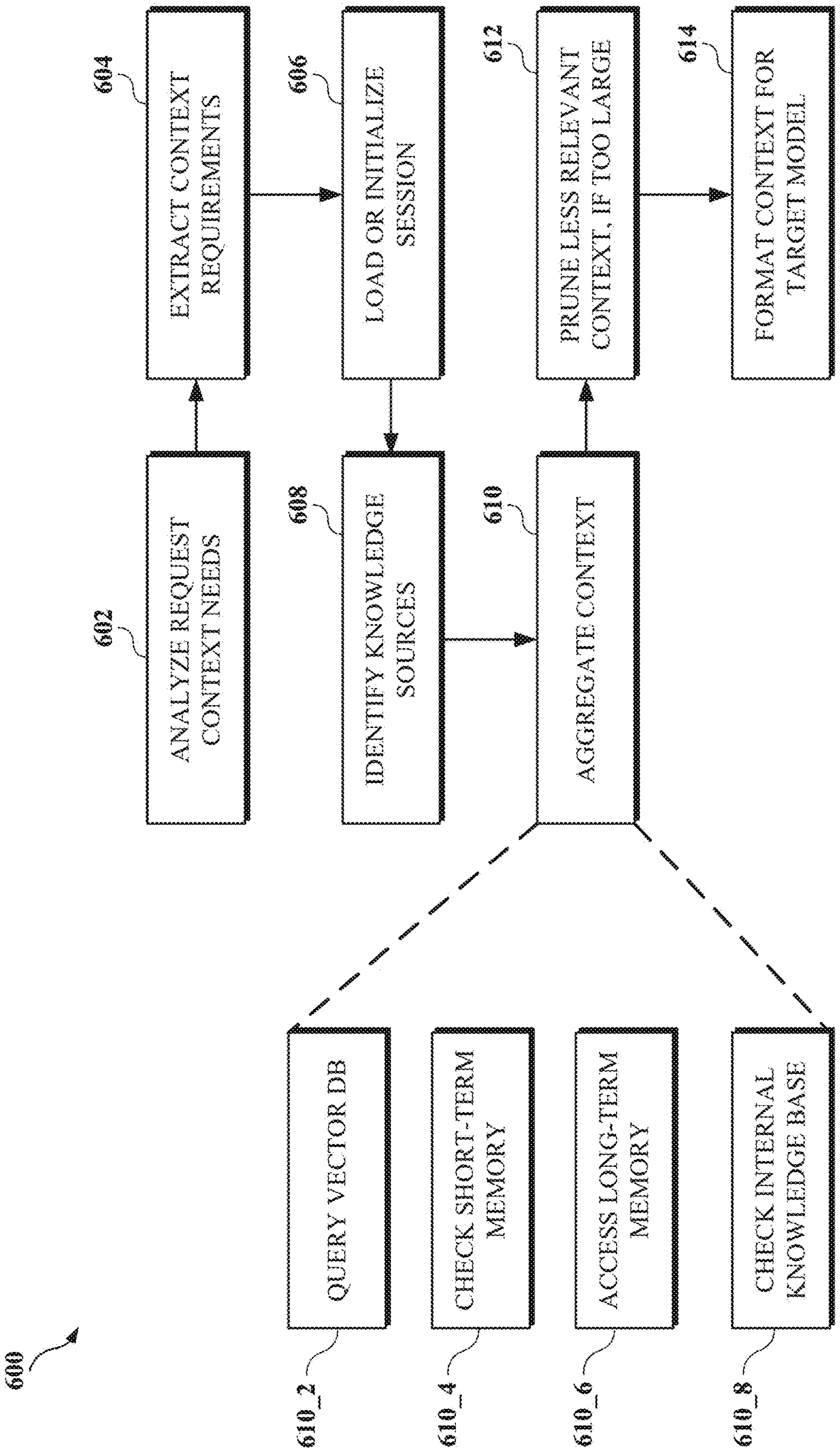
FIG. 6 is a flowchart of a technique for retrieving, processing, and integrating context data from multiple sources to support the fulfillment of AI model requests.
Figure 7:
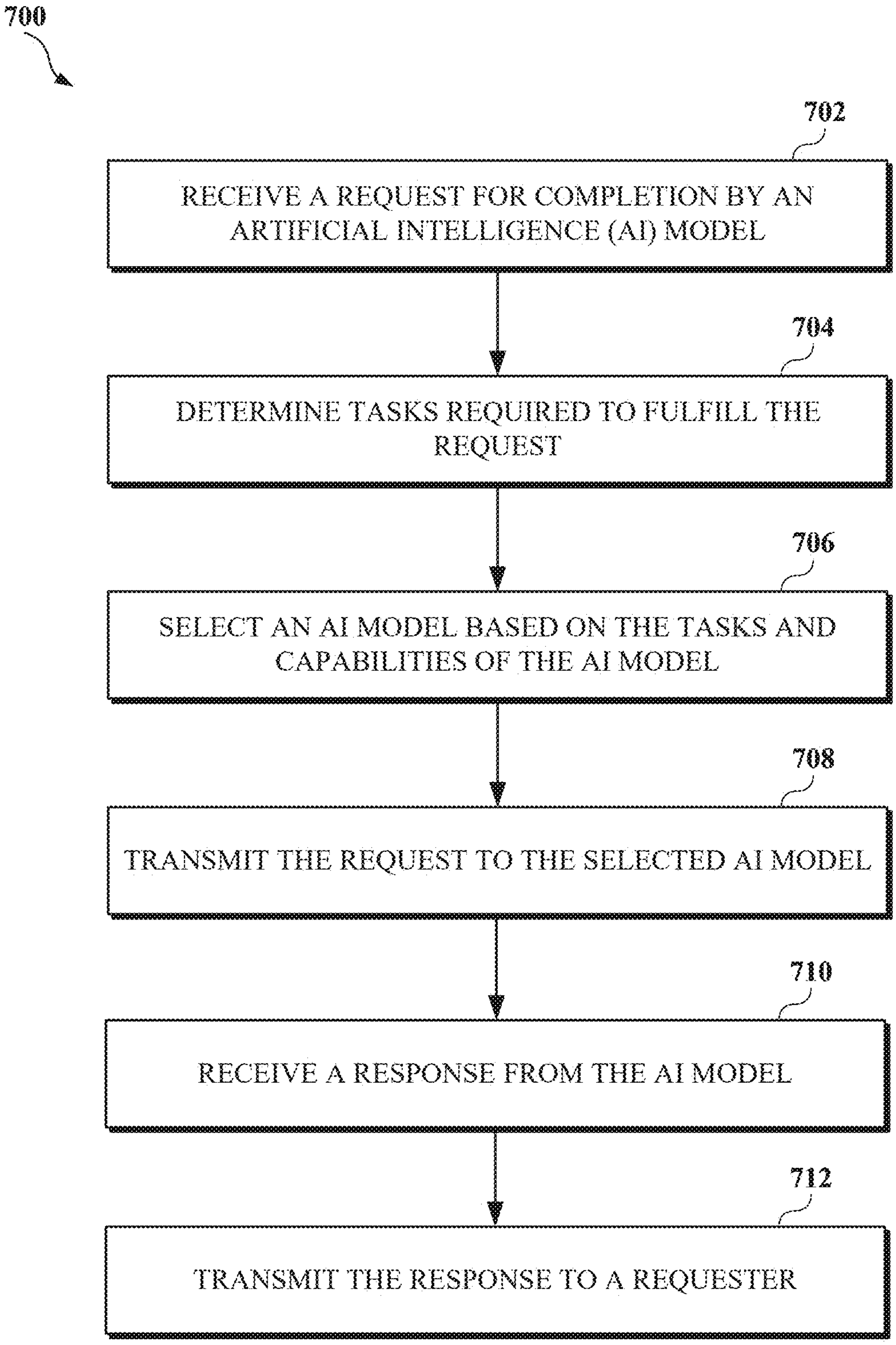
FIG. 7 is a flowchart of a technique for dynamically selecting and utilizing an AI model to process a request.
Figure 8:
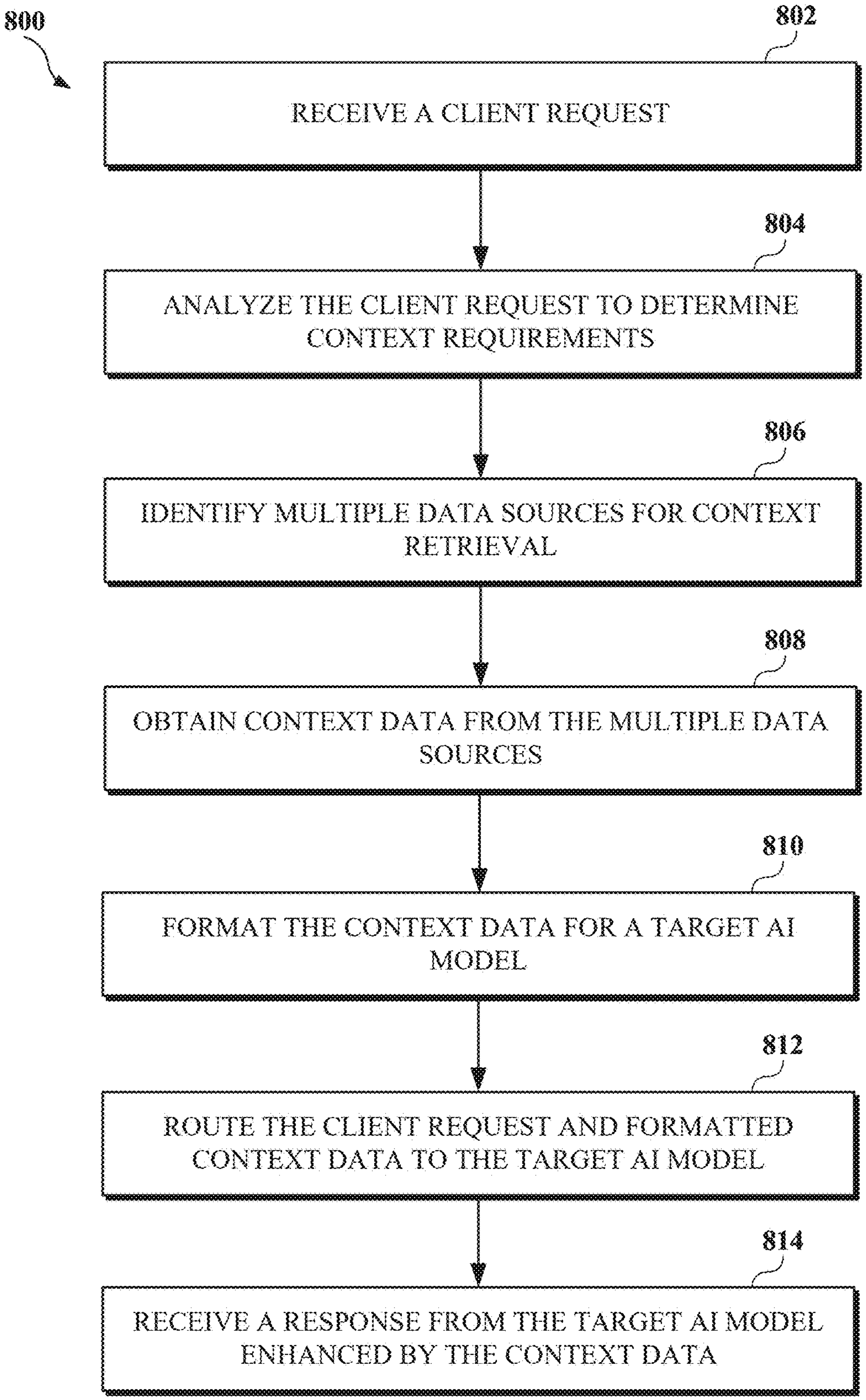
FIG. 8 is a flowchart of a technique for dynamically retrieving, formatting, and integrating context data from multiple sources to enhance the processing of client requests by an AI model.
Figure 9:
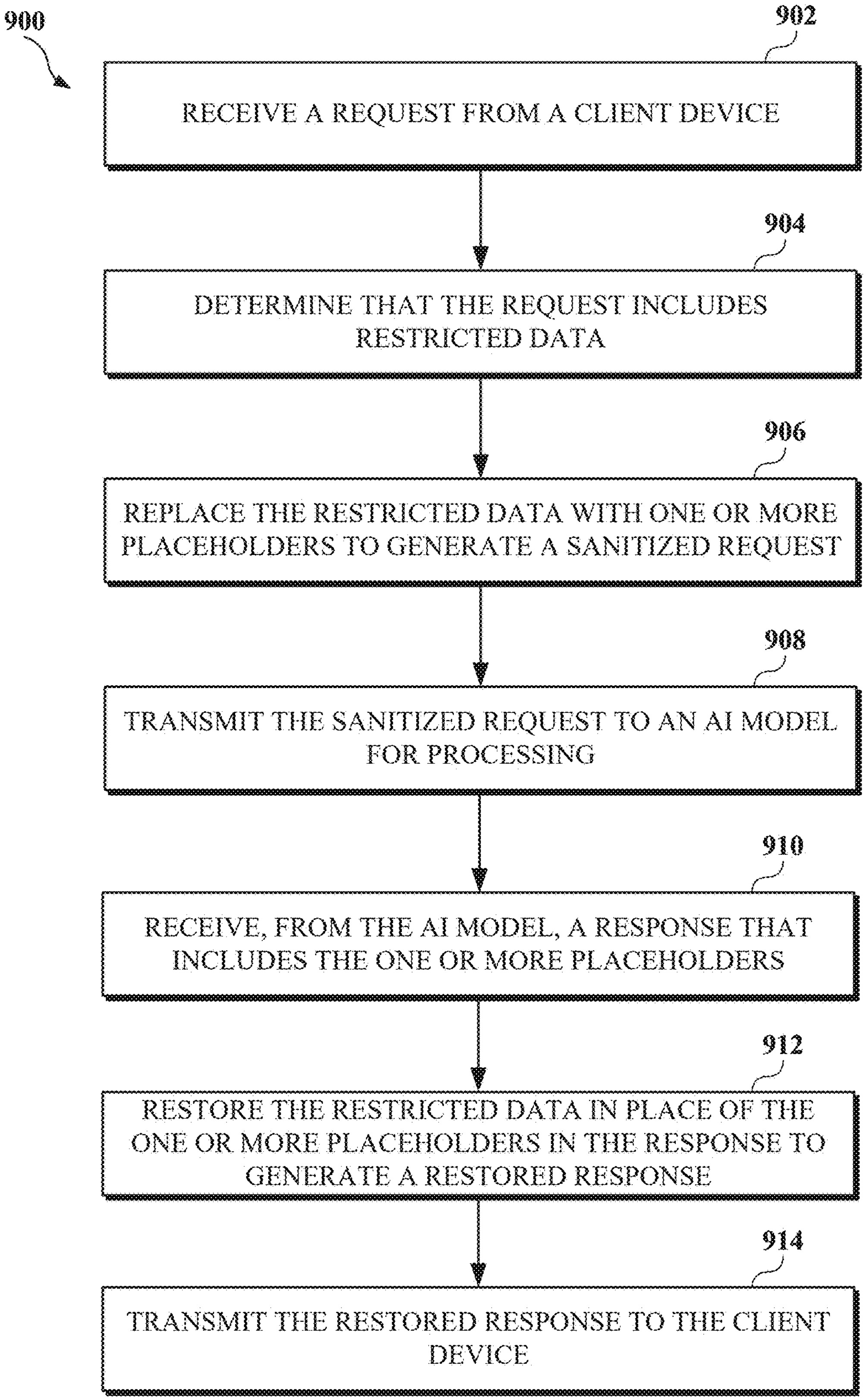
FIG. 9 is a flowchart of an example of a technique for anonymizing restricted data in requests processed by an agentic intermediary.

To further describe some implementations in greater detail, reference is next made to examples of techniques which may be performed by or using a system for agentic intermediary for managing AI providers. FIG. 5 is a flowchart of a technique 500 for dynamically selecting and invoking an optimal AI model to process client requests based on task requirements, client-defined parameters, and system conditions. FIG. 6 is a flowchart of a technique 600 for retrieving, processing, and integrating context data from multiple sources to support the fulfillment of AI model requests. FIG. 7 is a flowchart of a technique 700 for dynamically selecting and utilizing an AI model to process a request. FIG. 8 is a flowchart of a technique 800 for dynamically retrieving, formatting, and integrating context data from multiple sources to enhance the processing of client requests by an AI model. FIG. 9 is a flowchart of an example of a technique 900 for anonymizing restricted data in requests processed by an agentic intermediary.

The techniques 500 through 900 can each be executed using computing devices, such as the systems, hardware, and software described with respect to FIGS. 1-4D. Each of these techniques can be performed, for example, by executing a machine-readable program or other computer-executable instructions, such as routines, instructions, programs, or other code. The steps, or operations, of each of these techniques, or another technique, method, process, or algorithm described in connection with the implementations disclosed herein, can be implemented directly in hardware, firmware, software executed by hardware, circuitry, or a combination thereof. Each of these techniques can be implemented by an AAII.

For simplicity of explanation, these techniques are each depicted and described herein as a respective series of steps or operations. However, the steps or operations of these techniques, in accordance with this disclosure, can occur in various orders and/or concurrently. Additionally, other steps or operations not presented and described herein may be used. Furthermore, not all illustrated steps or operations may be required to implement a technique in accordance with the disclosed subject matter.

Referring now to FIG. 5, at block 502, a client request is received. This request can be submitted through various interfaces, such as an API, web interface, or another client-facing system. The request may include specific instructions or general queries, such as a request to analyze sales data, generate a summary of a document, or classify images. The request is such that completing or fulfilling it requires transmitting at least some aspect of the request to an AI model. The request may be received by the orchestrating agent 402 of FIG. 4A.

At block 504, the request requirements are analyzed. This step involves understanding the request's intent, determining its complexity, and identifying its associated data dependencies. As part of this analysis, context may be retrieved using the context engine 410, which interacts with various memory systems and external sources to enrich the request. Context retrieval may involve accessing the short-term memory 432 to maintain session continuity, such as retrieving conversation history for a chatbot. Context retrieval may also involve long-term memory 434 to retrieve historical data, such as prior interactions or client profiles, or a vector database to retrieve semantically relevant embeddings for tasks like contract summarization or complex query augmentation. Context may be retrieved from the customer infrastructure, such as from sources within the resource base 308 of FIG. 3, including internal tools, vector databases, document repositories, or databases, to ensure task-specific data is dynamically incorporated. For example, a request to summarize a document might involve retrieving the document directly from the customer's knowledge base. Retrieving the context can be as described with respect to FIG. 6.

In an example, the orchestrating agent 402 may coordinate the analysis of the request. For instance, the orchestrating agent 402 may provide the request to one or more of the internal AI models 420 of FIG. 4A. These internal AI models may analyze the request to identify tasks required to fulfill it, generate a plan for executing the tasks, and/or determine the context data needed for the tasks. The orchestrating agent 402 can then use this information to route the request to the appropriate components, such as external AI models, tools, or agents, while ensuring that the tasks are executed in a logical and efficient sequence.

At block 506, client-defined parameters are retrieved from the configuration/objectives database 438. This step is optional and provides additional context or constraints for fulfilling the request. For example, a client might specify that cost-effective models should be prioritized for routine tasks, while high-performance models are reserved for critical operations. The retrieved parameters guide subsequent operations, ensuring alignment with client preferences.

At block 508, security requirements are validated, such as by the security/compliance engine 412. This optional step involves consulting the security/compliance engine 412 to ensure that the request complies with privacy regulations and organizational policies. For instance, if the request includes sensitive data, such as personal identifiers or confidential business information, the system may anonymize or filter the data before proceeding. This validation ensures that data is processed securely and in compliance with applicable regulations, such as General Data Protection Regulation (GDPR) or Health Insurance Portability and Accountability Act (HIPAA).

As already mentioned herein, the security/compliance engine 412 may be implemented within the customer infrastructure, such as customer infrastructure 304 of FIG. 3. In such cases, the received request may already be validated for security and compliance requirements before reaching the AAII. This pre-validation ensures that sensitive data is appropriately processed and that the request complies with applicable privacy regulations and organizational policies.

At block 510, AI models are evaluated based on the request requirements. The evaluation criteria include task performance, cost constraints, real-time availability, and client-defined preferences retrieved in block 506. The AI model routing engine 404 leverages the AI models register 430 to identify potential models that meet these criteria. For example, if the task involves generating a natural language response with a long context window, the system may select a model optimized for extended contexts. If no preferred model is available or fails to meet the required performance thresholds, fallback strategies may be applied to select an alternative model.

At block 512, the request is routed to the selected model(s). The technique 500 transmits the input data to the chosen AI model, whether it is an internal model or an external provider. This step is orchestrated by the orchestrating agent 402, which coordinates the invocation of the appropriate AI models, tools, or agents based on the plan generated during the earlier steps. Depending on the task, this process may involve invoking one or more API endpoints, handling authentication, and ensuring compatibility between the request format and the model's expected input structure.

The orchestrating agent may determine an optimal execution strategy for the tasks, with some tasks being performed in parallel to improve efficiency, while others are executed sequentially to maintain dependencies or ensure correct workflow order. For example, in a classification task, the system may route the input data to a lightweight internal model to minimize cost and latency. In a more complex task, such as generating a report based on multiple datasets, the orchestrating agent may first retrieve and analyze data through one AI model and then route the results to another model or external tool for further processing. The determination of the optimal execution strategy can be driven by a multi-factor analysis that evaluates various technical elements to create adaptive task orchestration.

The scheduling engine 416 may employ configurations ranging from internally preset rules for common task types to dynamically retrieved parameters from the configuration/objectives database 438, which administrators can define via the Management API/UI. Client-supplied execution variables, tags, and rules received in real-time through the Client API/Web UI further refine this orchestration, allowing for request-specific customization that can override static configurations. Context data may be used in this determination, with the memory manager 418 accessing both the short-term memory 432 for session-specific states and the long-term memory 434 for historical execution patterns, while the context engine 410 supplies semantic relationships and task metadata that help identify independent subtasks suitable for parallel processing.

The execution strategy of the orchestrating agent 402 may also be dynamically adapted based on intermediate results from internal tools 422, external tools 322, internal agents 319, external agents 324, or AI models, enabling non-deterministic workflows where sequencing evolves during execution. Operational constraints may be used in the determination process. For example, the orchestrating agent may assess resource availability from registries such as the AI models register 430 and considers temporary unavailability due to connectivity or capacity limitations reported by the evaluation engine 414.

At block 514, the response generated by the AI model(s) is transmitted back to the requester. A response can be delivered either as a complete output or as a continuous stream, depending on the nature of the request and the selected AI model's capabilities. For streaming responses, the system transmits data incrementally as it's generated, such as for real-time voice synthesis or continuous video processing. The response may include the processed results, such as a completed summary, classification label, or data analysis output. Before transmission, the system may perform post-processing, such as formatting the response, ensuring it complies with security policies, or validating its accuracy. For example, in a customer service application, the system might ensure that a chatbot response aligns with the organization's tone and style guidelines.

In some implementations, the technique 500 may include additional steps not depicted in FIG. 5. For example, after each request is processed, the technique 500 may log performance metrics and telemetry data in the logs 440, enabling the evaluation engine 414 to analyze this feedback and refine future routing decisions for continuous optimization. For example, if a selected model is unavailable or performs sub-optimally, the technique 500 may dynamically apply fallback strategies, such as selecting an alternative model or adjusting task parameters to ensure successful completion. Although the technique 500 presents a linear progression, certain steps may be handled concurrently in practice. For example, the security validation at block 508 and the retrieval of client-defined parameters at block 506 might occur in parallel to improve efficiency and reduce processing time.

Referring now to FIG. 6, at block 602, a received request is analyzed to determine its context needs. This analysis may involve identifying the intent, complexity, and specific types of data required to enrich the request. Such data may include keywords, semantic relationships, relevant entities, prior interaction history, summaries of prior interactions, or any other information that an AI model can use to fulfill the request or a related task. Based on this analysis, the technique 600 extracts specific context requirements at block 604, which may involve identifying necessary background knowledge, relevant documents, historical data, or task dependencies.

At block 606, the technique 600 either loads an existing session, if one exists, or initializes a new session to manage context retrieval and maintain continuity across related tasks or multi-turn conversations. Session-specific data structures or variables may also be created to track the progress of the context retrieval process. Once the context requirements are identified, the technique 600 identifies relevant knowledge sources at block 608, which may include internal knowledge bases, external databases, domain-specific knowledge graphs, or embeddings.

At block 610, the technique 600 aggregates the required context by accessing one or more data sources, depending on the request's requirements. The sources accessed may include querying a vector database at block 610_2 to retrieve semantically relevant information, checking short-term memory at block 610_4 for recent or session-specific data, accessing long-term memory at block 610_6 to retrieve historical records or learned patterns, and checking an internal knowledge base at block 610_8 for organization-specific or proprietary knowledge. These operations may occur sequentially or in parallel, depending on the context requirements and system conditions.

Once the context is aggregated, at block 612, the technique 600 evaluates the context size and relevance. If the total amount of data in the context exceeds size limitations allowed, such as may be indicated in the AI models register 430 of FIG. 4A, by the model(s) to be used or includes irrelevant information, the technique 600 prunes less relevant context to ensure that only the most pertinent information is retained. At block 614, the remaining context is formatted for compatibility with the target AI model. This involves structuring the data, converting it into the required representation, or encoding it in a format suitable for processing. The enriched and formatted context is then integrated into the request-handling process to enable accurate and efficient task execution.

Referring now to FIG. 7, at block 702, the technique 700 begins by receiving a request for completion by an AI model. The received request may originate from a client system, an API endpoint, or another external source. The request can specify a variety of tasks, such as natural language processing, data analysis, or decision-making. For example, the request may ask the system to summarize a document, classify an image, or retrieve insights from a dataset.

At block 704, the technique 700 identifies the tasks required to fulfill the request. This step involves analyzing the request to break it into one or more specific tasks. For instance, a request to analyze sales data and generate a summary may involve retrieving the relevant data, applying data analysis models, and creating a narrative summary. In some implementations, analyzing the request may include identifying context requirements, such as retrieving client preferences or session-related data.

In some implementations, identifying the tasks required to fulfill the request may involve a multi-faceted analysis that uses both the inherent structure of the request and the capabilities of the AAII. The orchestrating agent may employ natural language processing (NLP) techniques, heuristic rules, or machine learning models—such as those within the internal AI models 420—to parse the request and extract an intent, a scope, and dependencies. For example, the orchestrating agent may utilize one of the internal AI models to analyze the semantic structure of the request, identifying action verbs, target objects, contextual constraints, and desired outputs. This analysis may generate a structured representation of the request components, such as identifying that a request to "compare quarterly sales performance across regions and create an executive summary highlighting key trends" requires distinct tasks including data retrieval from multiple sources, temporal analysis, spatial comparison, trend identification, and natural language generation. The decomposition may involve mapping the request to predefined task templates stored in the configuration/objectives database 438 or dynamically generating a task sequence based on real-time analysis, ensuring adaptability to both structured and unstructured inputs.

The technique 700 may then construct a directed acyclic graph (DAG) of task dependencies and execution pathways based on the identified components. Each node in this graph represents a distinct task with its own resource requirements, context needs, and expected outputs, while edges represent the flow of data or dependencies between tasks. For instance, in a complex request involving both data analysis and content generation, the DAG may indicate that certain analysis tasks must complete before generation can begin, while other analysis tasks can be performed in parallel to optimize performance (e.g., execution speed). The technique 700 may also annotate each task node with metadata regarding its priority, estimated resource requirements, fallback strategies, and compatibility with various AI models, tools, or agents available in the AAII.

Implementation of identifying the tasks can vary depending on the complexity of the request and the resources available within the AAII. For instance, in a scenario involving a continuous data stream, such as real-time audio from a customer call, the technique 700 may employ a streaming parser to segment the input into discrete units, each corresponding to a distinct task (e.g., speech-to-text conversion, sentiment analysis, and response formulation). The technique 700 may use a context engine (e.g., the context engine 410) to assess whether additional context, such as prior interactions stored in a short-term memory (e.g., the short-term memory 432) or organizational policies from a long-term memory (e.g., the long-term memory 434), is required to refine the task list. Task determination may also involve prioritizing tasks based on client-defined parameters (e.g., urgency or cost constraints) retrieved from the configuration/objectives database 438, ensuring that the sequence of operations aligns with operational objectives like minimizing latency or maximizing accuracy.

Beyond initial prioritization, the orchestrating agent 402 may dynamically adjust the execution order of tasks during request processing, adapting to intermediate results and evolving system conditions. This adaptability stems from a continuous evaluation of variables such as task outputs, resource availability, and performance metrics, enabling the system to, essentially, rethink and reconfigure its execution plan mid-process to optimize outcomes or address unexpected scenarios.

The orchestrating agent 402 may dynamically adjust the task execution plan by monitoring intermediate results from internal tools 422, external tools 322, internal agents 319, external agents 324, or AI models, using these outputs to reassess the task dependency graph, such as a directed acyclic graph (DAG), constructed during initial task decomposition. For instance, if a task like data classification yields an unexpected result (e.g., an anomaly requiring further analysis), the orchestrating agent 402 may invoke the context engine 410 to retrieve additional context data from the short-term memory 432 or long-term memory 434, prompting a redefinition of subsequent tasks. This could involve skipping planned tasks deemed irrelevant, adding new tasks not originally anticipated, or altering the priority of remaining tasks to expedite critical operations, all coordinated through real-time updates to the DAG's structure and execution flow.

Furthermore, changing conditions such as model unavailability or performance degradation, as reported by the evaluation engine 414, may trigger the orchestrating agent 402 to re-sequence subtasks. If an AI model from the AI models register 430 becomes temporarily unavailable due to connectivity issues or exceeds latency thresholds, the AI model routing engine 404 may substitute an alternative model, prompting the orchestrating agent to adjust downstream task dependencies accordingly. This adjustment may shift the execution flow to a completely different branch, such as rerouting from a high-cost, high-performance model to a lightweight internal model, recalibrating resource allocation to maintain cost constraints. The orchestrating agent 402 may employ internal AI models 420 to analyze intermediate results and system telemetry from the logs 440, enabling predictive re-sequencing without relying solely on external prompts, though it may query an AI model for complex re-planning if the task complexity exceeds predefined thresholds stored in the configuration/objectives database 438.

Upon constructing a task graph, the technique 700 may perform a feasibility analysis to determine whether all required tasks can be fulfilled with the available resources and capabilities. This involves consulting the AI models register 430 to identify models capable of performing each task, evaluating the availability of necessary context data in the short-term memory 432, long-term memory 434, or other memory systems, and estimating the computational and time resources required for task completion. If gaps are identified, such as tasks requiring capabilities not available in the registered models or context data that cannot be retrieved, the technique 700 may implement contingency strategies, such as decomposing tasks into simpler subtasks, substituting with alternative approaches, or prompting the requester for additional information to enable task fulfillment.

To illustrate further, consider a complex request such as "Generate a quarterly sales report with forecasts and email it to the sales team." The task determination process breaks this into a series of interdependent subtasks: (1) querying a sales database, such as database 316, for historical data; (2) invoking an AI model specialized in data analysis, via the AI model routing engine 404, to compute trends and forecasts; (3) formatting the results into a narrative report using a language generation model; and (4) triggering an external tool, such as external tools 322, to send the email. The technique 700 may use a dependency graph or a workflow engine within the orchestrating agent to establish execution order—ensuring data retrieval precedes analysis—and may parallelize independent tasks, such as formatting and email preparation, to optimize efficiency. This step may also incorporate feedback from the evaluation engine 414 to refine task definitions based on historical performance, such as adjusting the scope of analysis if prior models struggled with certain data volumes, thereby enhancing the ability to handle diverse and evolving requests effectively.

At block 706, the technique 700 selects an AI model based on the tasks and capabilities of the AI model. The selection process may include retrieving client-defined parameters from a configuration database and identifying eligible AI models from an AI models register. The technique 700 evaluates the eligible AI models based on criteria such as real-time availability, performance metrics, and/or cost constraints. For example, if the task requires high accuracy and a long context window, the technique 700 may select a high-performance external model. If the request involves a lightweight classification task, an internal AI model optimized for low cost and latency may be selected.

Retrieving client-defined parameters from a configuration database may include accessing the configuration/objectives database 438, a centralized repository for operational preferences and constraints tailored to the client's needs. These parameters may be hierarchically structured, encompassing global preferences applicable to all requests, domain-specific parameters for particular task types, and request-specific overrides defined at runtime. The parameters may include quantitative thresholds, such as maximum acceptable latency (e.g., 500 milliseconds), cost limits per request (e.g., $0.01 per million tokens), or minimum accuracy requirements (e.g., 95% on a benchmark like MMLU), and qualitative directives, such as prioritizing models with specific capabilities (e.g., vision processing or tool integration) or restricting selection to providers compliant with regional data privacy regulations (e.g., GDPR). The technique 700 may query the database via an API call, retrieving a structured parameter set, potentially encoded in JSON, which the system parses to filter the initial pool of AI models. The retrieval may employ rule-based lookup that resolves parameter inheritance and precedence according to client-defined logic stored in the database. For example, in a customer service chatbot scenario, a client might specify low-cost models for off-peak hours and high-performance models for peak demand, enabling the technique 700 to dynamically adjust its selection strategy based on temporal or contextual factors.

Using the client-defined parameters, the technique 700 identifies a set of eligible AI models by consulting an AI models register (e.g., the AI models register 430). As described herein, the AI models register includes entries for each model, detailing technical specifications—such as supported context window size (e.g., 128,000 tokens), processing speed (e.g., tokens per second), and API endpoints—as well as performance metrics derived from historical usage (e.g., average latency, error rates) and compatibility with task types (e.g., classification, generation, reasoning). The technique 700 may apply a filtering algorithm that cross-references the task requirements identified at block 704—such as data analysis or natural language generation—with the client-defined parameters and model metadata.

The identification process may implement a multi-stage filtering approach: an initial filter eliminates models lacking mandatory capabilities (e.g., models without code generation for programming tasks), followed by a scoring phase that ranks remaining candidates based on alignment with client-specified criteria. The filtering may leverage a capability ontology, mapping high-level task requirements to specific model capabilities for semantic matching beyond simple keyword comparison. To illustrate, a request requiring a long context window and code generation might exclude lightweight models while shortlisting external models optimized for programming, such as those excelling in benchmarks like HumanEval. The technique 700 may also dynamically update the eligible set with real-time status checks, querying provider APIs to confirm model availability or load conditions, and periodically synchronize with external provider APIs to ensure metadata accuracy for newly released model versions or features.

The technique 700 may evaluate the eligible AI models using a multi-criteria decision-making process, orchestrated by the AI model routing engine 404, to balance real-time availability, performance metrics, and cost constraints in selecting an optimal model. This evaluation may employ a weighted scoring algorithm that assesses static metadata from the AI models register 430 and dynamic operational metrics. Real-time availability is monitored via factors such as server uptime, request queues, or rate limits, retrieved through API calls to external providers or telemetry from the logs 440, with health probes or status checks cached for a configurable time window to balance responsiveness and API overhead. Performance metrics—such as accuracy, latency, and robustness—are weighted against client priorities; for example, a task requiring high factual accuracy might prioritize a model with a strong MMLU score despite higher latency, while a real-time application might favor a faster model with lower accuracy.

The technique 700 incorporates real-time quality assessments from the evaluation engine 414, using a moving average to detect performance trends. Cost constraints are evaluated by incorporating dynamic pricing, usage quotas, and budget allocations, with just-in-time optimization factoring in time-of-day variations, bulk discounts, or tier thresholds. This cost-aware evaluation optimizes resource use within budgetary limits—for instance, selecting a higher-cost model for high-priority tasks and cost-effective options for routine requests. The optimal model is selected via a configurable weighting function, optionally enhanced by machine learning to adapt weights based on observed outcomes and feedback, improving selections over time. The decision and rationale are logged in the logs 440, fostering a continuous feedback loop that refines the selection process.

At block 708, the technique 700 transmits the request to the selected AI model. This step may involve invoking an API endpoint or another communication interface provided by the AI model. The technique 700 formats the request according to the model's input requirements, which may include preprocessing the request or augmenting it with context data. For example, if the request involves a chatbot scenario, the technique 700 may include prior conversation history retrieved from a short-term memory store.

At block 710, the technique 700 receives a response from the AI model. The response may include processed data, insights, or results generated by the AI model. For instance, in a document summarization request, the response may include a textual summary generated by the AI model. In some implementations, the technique 700 may monitor the performance metrics of the selected AI model while processing the request to update the AI models register and inform future selection processes (e.g., future AI model selection).

At block 712, the technique 700 transmits the response to the requester. The response may be sent back through the same channel from which the request was received or another specified endpoint. The response is delivered in a format suitable for the requester's application. For example, the result may be formatted in a structured way (such as a JavaScript Object Notation (JSON) object) for an API client or as a human-readable text for a user-facing application.

In some implementations, selecting the AI model includes filtering a set of AI models based on compatibility with the tasks to exclude AI models lacking required capabilities and ranking the filtered AI models using a scoring function that weights task-specific performance criteria. The technique 700 (e.g., via the AI model routing engine 404) may execute a multi-stage process, beginning with capability-based filtering that applies a constraint satisfaction algorithm to the AI models register. As mentioned, the AI models register may contain a capability matrix mapping each model to supported features—such as natural language generation, code interpretation, or visual analysis—and specifications like context window size (e.g., 128,000 tokens). To illustrate, a task requiring document summarization excludes models without text processing or sufficient context capacity. The remaining models may be ranked using a weighted scoring function, aggregating parameters like inference speed for real-time tasks, accuracy (e.g., HumanEval scores for coding), or token efficiency for cost-sensitive operations. Weights can be dynamically adjusted based on task priorities from client-defined parameters in the configuration/objectives database 438 or historical performance data from the logs 440, producing an ordered list where the highest-scoring model is selected, ensuring optimal alignment with the request's needs.

In some implementations, the technique 700 may include validating security requirements of the request using a security engine before transmitting the request to the selected AI model and anonymizing sensitive data in the request if the selected AI model is an external model. Via the security/compliance engine 412, the technique 700 may analyze the request against predefined policies in the configuration/objectives database 438, using pattern recognition, named entity recognition, or semantic analysis to detect sensitive elements like personally identifiable information (PII) or regulated data (e.g., HIPAA-protected health information). For example, in a healthcare scenario, the technique 700 may identify patient names or clinical terms requiring protection. If the selected model is an external model (e.g., from external AI models 320), the technique 700 anonymizes data by replacing identifiers with pseudonyms (e.g., "Patient_X"), redacting confidential content, or applying differential privacy techniques, tracked via a secure mapping table within the AAII.

In some implementations, transmitting the request to the selected AI model includes formatting the request into a data structure compatible with an API endpoint of the selected AI model and transmitting the formatted request via a secure communication channel. The technique 700 may construct a JSON or protocol buffer payload, adapting the request to the model's API specification from the AI models register 430, including headers and fields like "prompt" or "max_tokens" (e.g., chunking a large request to fit a 1024-token limit). Binary data, such as images, may be encoded (e.g., using base64). The formatted request may be transmitted over a secure channel using Transport Layer Security (TLS). For external models (e.g., external AI models 320), mutual TLS authentication verifies identities via digital certificates, supplemented by rate limiting and token-based authentication to prevent unauthorized access, ensuring secure and reliable data exchange as coordinated with the security/compliance engine 412.

In some implementations, the technique 700 may include decomposing the request into a plurality of subtasks if the request exceeds a complexity threshold and selecting a distinct AI model for at least one subtask based on specialized capabilities of the distinct AI model. Via the orchestrating agent 402, the technique 700 may evaluate complexity using metrics like the number of operations (e.g., retrieval, analysis, generation), estimated computational resources, or context breadth, compared against thresholds in the configuration/objectives database 438 (e.g., over three tasks). To illustrate, a request such as "analyze financial data, identify trends, and generate a visualized report" may be segmented into subtasks—data retrieval, trend analysis, and report creation—using dependency analysis or workflow partitioning. Via the AI model routing engine 404, the technique 700 may then select distinct models from the AI models register 430, routing numerical analysis to a model optimized for mathematical reasoning and report generation to one with strong natural language capabilities. Via the orchestrating agent 402, the technique 700 manages dependencies and aggregates results, leveraging specialized strengths to efficiently process complex requests.

Referring now to FIG. 8, at block 802, the technique 800 receives a client request. The request specifies a task to be completed by the system, such as generating a summary, performing a classification, or answering a query. The request may include parameters defining the task scope or requirements, such as accuracy thresholds or cost constraints.

At block 804, the client request is analyzed to determine the context requirements necessary to fulfill the task. This step involves identifying the intent and complexity of the request and extracting specific requirements such as keywords, entities, semantic relationships, or dependencies between the request and prior interactions stored in memory. For example, in a legal document summarization task, the system may identify that contextual information about key clauses and related legal terms is required to fulfill the request.

At block 806, the technique 800 identifies multiple data sources for context retrieval. These data sources may include at least one of a vector database, a short-term memory store for active session data, a long-term memory store for historical records, or an internal knowledge base containing proprietary client information. For instance, the technique 800 may identify a vector database to retrieve semantic embeddings and a knowledge base for specific contractual terms.

At block 808, the context data is obtained from (e.g., based on) the identified data sources. This step includes retrieving, aggregating, and refining context data from the selected sources. In some implementations, this may include pruning, to obtain remaining context data, and less relevant context data if the total amount exceeds a size limitation imposed by the target AI model. For example, the technique 800 may aggregate embeddings from the vector database, session-specific details from short-term memory, and historical records from long-term memory while discarding less relevant information to ensure optimized input for the AI model.

At block 810, the aggregated context data is formatted for compatibility with the target AI model. This step involves converting the context data into a format required by the model and embedding metadata to preserve task-specific parameters, such as user preferences or security constraints. For example, the system may structure the data as a JSON object with metadata tags indicating priority fields or processing instructions.

At block 812, the client request and the formatted context data are routed to the target AI model. This may involve invoking an API endpoint or another communication mechanism specific to the selected AI model. The system ensures compatibility between the input format of the request and the AI model's requirements. For instance, the system may append enriched context data to a natural language generation task to improve accuracy and relevance in the AI model's output.

At block 814, a response is received from the target AI model. The response is enhanced by the integrated context data, allowing the system to provide an accurate and contextually relevant output. For instance, in a chatbot scenario, the response may include detailed answers enriched with client-specific knowledge retrieved during the context aggregation step. Once the response is received, the system transmits the response to the requester in the desired format, completing the request processing workflow.

Referring now to FIG. 9, at 902, the technique 900 receives a request from a client device. For example, an agentic intermediary (such as the AAII 400 shown in FIG. 4A) may receive a request from a client device (such as the user device 462 shown in FIG. 4C). The request may include specific instructions or general queries, such as a request to analyze data, generate a summary, draft a document, or perform other AI-related tasks. The request may be received by the orchestrating agent 402, which coordinates processing through the security/compliance engine 412.

At 904, the technique 900 determines that the request includes restricted data. For example, the security/compliance engine 412 may analyze the request to identify content that matches guardrails rules defining restricted data categories. The restricted data may include personally identifiable information (PII), financial data, proprietary business information, confidential organizational data, or content that violates organizational policies. In some implementations, determining that the request includes restricted data may include evaluating the request against guardrails rules retrieved from a configuration database, such as the configuration/objectives database 438.

The determination may be performed using multiple techniques. In some implementations, the security/compliance engine 412 may apply pattern-matching techniques, such as regular expressions that match patterns indicative of restricted data including social security numbers, credit card numbers, email addresses, or phone numbers. In some implementations, the security/compliance engine 412 may employ natural language processing algorithms that analyze request intent and context. In some implementations, machine learning models or SLMs may evaluate requests against configured prompts to determine whether the requests contain sensitive information or express intentions that violate organizational policies.

The technique 900 may include evaluating the request against guardrails rules before replacing restricted data. For example, before replacing the restricted data, the security/compliance engine 412 may evaluate the request against guardrails rules to determine whether the request violates the guardrails rules. The technique 900 may determine that the request does not violate the guardrails rules, such that replacing the restricted data is performed in response to determining that the request does not violate the guardrails rules. This approach may be appropriate when guardrails violations should be detected immediately to avoid expending computational resources on anonymization processing for requests that will be blocked.

In some implementations, the technique 900 may include determining whether the restricted data can be successfully replaced with placeholders while preserving a logical structure of the request. For example, the security/compliance engine 412 may evaluate whether placeholder substitution would render the request nonsensical or unable to be fulfilled by an AI model. In response to determining that the restricted data cannot be successfully replaced, the technique 900 may block the request. In some implementations, the technique 900 may return an error response to the client device based on determination that the restricted data cannot be replaced with placeholders without breaking a logical structure of the request.

At 906, the technique 900 replaces the restricted data with one or more placeholders to generate a sanitized request. For example, the security/compliance engine 412 may substitute each instance of restricted data identified at 904 with a unique placeholder identifier, thereby generating a sanitized request that preserves the logical structure of the original request while obscuring actual restricted data values. The one or more placeholders may indicate a category of the restricted data being replaced, such as using naming conventions like "PERSON_A" for person names, "COMPANY_X" for organization names, or "ACCOUNT_Y" for account identifiers.

In some implementations, replacing the restricted data may include using a naming convention by placeholder type, where the naming convention indicates a category of the restricted data being replaced. For example, person name placeholders may follow a pattern such as "NAME_1," "NAME_2," while organization placeholders may follow a pattern such as "COMPANY_A," "COMPANY_B." In some implementations, replacing the restricted data may include maintaining consistency in placeholder assignments such that multiple occurrences of a same restricted data value are replaced with a same placeholder identifier. This consistency facilitates accurate restoration and maintains coherence when the same entity is referenced multiple times within a request.

The technique 900 may apply different anonymization strategies based on data type. The security/compliance engine 412 may redact numerical identifiers entirely, such as removing or obscuring social security numbers, credit card numbers, or account numbers. The security/compliance engine 412 may substitute placeholders for textual identifiers, such as replacing names, addresses, or organization names with generic placeholders. The security/compliance engine 412 may apply partial redaction where only sensitive portions of data are obscured, or generalization where specific values are replaced with broader category descriptors.

The technique 900 may include creating bidirectional association records in a placeholder mapping data store. For example, the security/compliance engine 412 may create records in the placeholder mapping data store 464, where each record pairs an original restricted data value with its corresponding placeholder identifier. The technique 900 may encrypt the bidirectional association records before storing them in the placeholder mapping data store. Encryption may be performed using keys held exclusively by the security/compliance engine 412, such that even if other components or external resources were compromised, the mappings between placeholders and original restricted data would remain protected.

In some implementations, after replacing the restricted data and before transmitting the sanitized request to the AI model, the technique 900 may evaluate the sanitized request against guardrails rules. For example, the security/compliance engine 412 may evaluate the sanitized request to determine whether the sanitized request violates guardrails rules. The technique 900 may determine that the sanitized request does not violate the guardrails rules, such that transmitting the sanitized request to the AI model is performed in response to this determination. This approach may be appropriate when guardrails checking uses external services that should not receive unsanitized restricted data.

At 908, the technique 900 transmits the sanitized request to an AI model for processing. For example, the agentic intermediary may transmit the sanitized request generated at 906 to an external AI model (such as one of the external AI models 320 shown in FIG. 3) or an internal AI model (such as one of the internal AI models 420 shown in FIG. 4A) for processing. The sanitized request contains placeholders in place of restricted data, such that the AI model processes an anonymized version of the original request without access to actual restricted data values.

In some implementations, transmitting the sanitized request may include selecting the AI model from an AI models register, such as the AI models register 430. For example, the AI model routing engine 404 may select an appropriate AI model based on task requirements, performance criteria, cost constraints, and security considerations. Selecting the AI model may include filtering a plurality of available AI models to identify a subset of trusted AI models that comply with a predefined security policy. The technique 900 may then select the AI model from the subset of trusted AI models, such that only models meeting organizational security standards process the sanitized request.

Transmitting the sanitized request may include appending metadata to indicate that the request has been sanitized. For example, the agentic intermediary may attach metadata tags indicating that the request has undergone security processing and contains placeholders rather than original data. This metadata may enable the AI model or intermediate systems to apply appropriate handling procedures for sanitized requests. The sanitized request may be transmitted via secure communication channels, such as encrypted connections using TLS or mutual TLS authentication with digital certificates.

At 910, the technique 900 receives, from the AI model, a response that includes the one or more placeholders. For example, the agentic intermediary may obtain a response generated by the AI model based on processing the sanitized request transmitted at 908. The response includes placeholders rather than actual restricted data values because the AI model processed a sanitized request containing placeholders and therefore generated output that references those same placeholders. For example, if the sanitized request asked, "Draft a welcome letter for PERSON_A joining COMPANY_X," the response might state "Dear PERSON_A, welcome to COMPANY_X."

In some implementations, receiving the response may include validating the metadata prior to restoring restricted data. For example, the security/compliance engine 412 may verify that metadata attached to the response corresponds to metadata sent with the sanitized request, confirming that the response is properly associated with the original request. In some implementations, the technique 900 may include validating that placeholders in the response from the AI model match the placeholders in the sanitized request. The security/compliance engine 412 may detect anomalies where the AI model introduced unexpected placeholders or modified existing placeholder identifiers. In some implementations, the technique 900 may discard the response if unexpected placeholders are detected, and may generate a new request or return an error to the client device.

At 912, the technique 900 restores the restricted data in place of the one or more placeholders in the response to generate a restored response. For example, the security/compliance engine 412 may retrieve mapping entries from the placeholder mapping data store 464 and substitute each placeholder identifier in the response with its corresponding original restricted data value, thereby generating a restored response that contains actual information requested by the client device. The restoration process may identify each placeholder present in the response, query the placeholder mapping data store to obtain the original restricted data value associated with that placeholder, and replace the placeholder with the original value.

The restoration may be performed using the bidirectional association records created at 906. In some implementations, the security/compliance engine 412 may validate that every placeholder in the response has a corresponding mapping entry in the placeholder mapping data store, detecting any inconsistencies where the AI model may have generated responses containing placeholders that were not present in the sanitized request. For example, when the response contains "Dear PERSON_A, welcome to COMPANY_X," the restoration process retrieves mappings indicating that PERSON_A corresponds to "John Smith" and COMPANY_X corresponds to "Acme Corporation," generating the restored response "Dear John Smith, welcome to Acme Corporation."

In some implementations, the technique 900 may include deleting the bidirectional association records from the placeholder mapping data store after transmitting the restored response to the client device. For example, the security/compliance engine 412 may delete or invalidate mapping entries after the restored response is generated, such that the mappings between placeholders and original restricted data values are not retained longer than necessary. This deletion minimizes the window during which sensitive mapping data exists in storage, reducing security risks. In some implementations, the mappings may be assigned expiration times such that they are automatically deleted after a specified duration or after the restored response is transmitted.

At 914, the technique 900 transmits the restored response to the client device. For example, the agentic intermediary may forward the restored response generated at 912 to the client device through the orchestrating agent 402. The restored response contains the actual restricted data values requested by the client device, reconstructed by replacing placeholders with original data from the placeholder mapping data store. The transmission may apply additional security measures, such as encryption, authentication, and access controls to protect the confidentiality of the restored response during transit.

In some implementations, the technique 900 may log telemetry data regarding the successful completion of the placeholder replacement workflow. For example, the security/compliance engine 412 may record metrics including the number of placeholders that were replaced, the types of restricted data that were anonymized, the AI model that processed the sanitized request, and the total processing time required for the complete workflow. This telemetry data may be stored in the logs 440 for visibility, auditing, and compliance purposes. The telemetry data may be transmitted to external SIEM systems to facilitate real-time security monitoring and threat detection.

Another aspect of the disclosed implementations is a technique that includes receiving a request from a client device at an agentic intermediary, analyzing the request using a security engine to determine whether the request violates one or more guardrails rules, and in response to determining that the request violates the guardrails rules, blocking processing of the request prior to transmission to an external resource. The technique may generate an error response indicating that the request cannot be processed and transmit the error response to the client device. This approach may be appropriate when requests contain prohibited content or violate organizational policies such that no processing should occur, regardless of whether restricted data could be anonymized.

Another aspect of the disclosed implementations is a technique that includes receiving a request from a client device at an agentic intermediary, analyzing the request using a security engine to determine whether the request includes sensitive data, and in response to determining that the request includes sensitive data, selecting a trusted AI model from among a plurality of candidate AI models based at least in part on compliance with one or more security rules. The technique may transmit the request or a sanitized version of the request to the trusted AI model for processing, receive a response from the trusted AI model, and transmit the response to the client device. This approach facilitates routing sensitive requests only to AI models that meet organizational security and compliance requirements.

Another aspect of the disclosed implementations is a technique that includes receiving a request from a requester at an agentic AI intermediary, evaluating the request by a security engine to determine if it violates one or more guardrails rules stored in a configuration database, and in response to determining that the request violates the guardrails rules, blocking transmission of the request to any AI model, generating an error response indicating that the request was blocked due to a policy violation, and transmitting the error response to the requester. This implementation emphasizes preventing any processing of requests that violate organizational policies, providing clear feedback to users about policy enforcement.

Unless expressly stated, or otherwise clear from context, the terminology "computer," and variations or wordforms thereof, such as "computing device," "computing machine," "computing and communications device," and "computing unit," indicates a "computing device," such as the computing device 100 shown in FIG. 1, that implements, executes, or performs one or more aspects of the methods and techniques described herein, or is represented by data stored, processed, used, or communicated in accordance with the implementation, execution, or performance of one or more aspects of the methods and techniques described herein.

Unless expressly stated, or otherwise clear from context, the terminology "instructions," and variations or wordforms thereof, such as "code," "commands," or "directions," includes an expression, or expressions, of an aspect, or aspects, of the methods and techniques described herein, realized in hardware, software, or a combination thereof, executed, processed, or performed, by a processor, or processors, as described herein, to implement the respective aspect, or aspects, of the methods and techniques described herein. Unless expressly stated, or otherwise clear from context, the terminology "program," and variations or wordforms thereof, such as "algorithm," "function," "model," or "procedure," indicates a sequence or series of instructions, which may be iterative, recursive, or both.

Unless expressly stated, or otherwise clear from context, the terminology "communicate," and variations or wordforms thereof, such as "send," "receive," or "exchange," indicates sending, transmitting, or otherwise making available, receiving, obtaining, or otherwise accessing, or a combination thereof, data in a computer accessible form via an electronic data communications medium.

As used herein, unless explicitly stated otherwise, any term specified in the singular may include its plural version. For example, "a computer that stores data and runs software," may include a single computer that stores data and runs software or two computers-a first computer that stores data and a second computer that runs software. Also "a computer that stores data and runs software," may include multiple computers that together stored data and run software. At least one of the multiple computers stores data, and at least one of the multiple computers runs software.

As used herein, the term "computer-readable medium" encompasses one or more computer readable media. A computer-readable medium may include any storage unit (or multiple storage units) that store data or instructions that are readable by processing circuitry. A computer-readable medium may include, for example, at least one of a data repository, a data storage unit, a computer memory, a hard drive, a disk, or a random access memory. A computer-readable medium may include a single computer-readable medium or multiple computer-readable media. A computer-readable medium may be a transitory computer-readable medium or a non-transitory computer-readable medium.

As used herein, the term "memory subsystem" includes one or more memories, where each memory may be a computer-readable medium. A memory subsystem may encompass memory hardware units (e.g., a hard drive or a disk) that store data or instructions in software form. Alternatively or in addition, the memory subsystem may include data or instructions that are hard-wired into processing circuitry.

As used herein, processing circuitry includes one or more processors. The one or more processors may be arranged in one or more processing units, for example, a central processing unit (CPU), a graphics processing unit (GPU), or a combination of at least one of a CPU or a GPU.

As used herein, the term "engine" may include software, hardware, or a combination of software and hardware. An engine may be implemented using software stored in the memory subsystem. Alternatively, an engine may be hard-wired into processing circuitry. In some cases, an engine includes a combination of software stored in the memory subsystem and hardware that is hard-wired into the processing circuitry.

To the extent that the respective aspects, features, or elements of the devices, apparatus, methods, and techniques described or shown herein, are shown or described as a respective sequence, order, configuration, or orientation, thereof, such sequence, order, configuration, or orientation is explanatory and other sequences, orders, configurations, or orientations may be used, which may be include concurrent or parallel performance or execution of one or more aspects or elements thereof, and which may include devices, methods, and techniques, or aspects, elements, or components, thereof, that are not expressly described herein, except as is expressly described herein or as is otherwise clear from context. One or more of the devices, methods, and techniques, or aspects, elements, or components, thereof, described or shown herein may be omitted, or absent, from respective embodiments.

The figures, drawings, diagrams, illustrations, and charts shown and described herein express or represent the devices, methods, and techniques, or aspects, elements, or components, thereof, as disclosed herein. The elements, such as blocks and connecting lines, of the figures, drawings, diagrams, illustrations, and charts, shown and described herein, or combinations thereof, may be implemented or realized as respective units, or combinations of units, of hardware, software, or both.

Unless expressly stated, or otherwise clear from context, the terminology "determine," "identify," and "obtain," and variations or wordforms thereof, indicates selecting, ascertaining, computing, looking up, receiving, determining, establishing, obtaining, or otherwise identifying or determining using one or more of the devices and methods shown and described herein. Unless expressly stated, or otherwise clear from context, the terminology "example," and variations or wordforms thereof, such as "embodiment" and "implementation," indicates a distinct, tangible, physical realization of one or more aspects, features, or elements of the devices, methods, and techniques described herein. Unless expressly stated, or otherwise clear from context, the examples described herein may be independent or may be combined.

Unless expressly stated, or otherwise clear from context, the terminology "or" is used herein inclusively (inclusive disjunction), rather than exclusively (exclusive disjunction). For example, unless expressly stated, or otherwise clear from context, the phrase "includes A or B" indicates the inclusion of "A," the inclusion of "B," or the inclusion of "A and B." Unless expressly stated, or otherwise clear from context, the terminology "a," or "an," is used herein to express singular or plural form. For example, the phrase "an apparatus" may indicate one apparatus or may indicate multiple apparatuses. Unless expressly stated, or otherwise clear from context, the terminology "including," "comprising," "containing," or "characterized by," is inclusive or open-ended such that some implementations or embodiments may be limited to the expressly recited or described aspects or elements, and some implementations or embodiments may include elements or aspects that are not expressly recited or described.

As used herein, numeric terminology that expresses quantity (or cardinality), magnitude, position, or order, such as numbers, such as 1 or 20.7, numerals, such as "one" or "one hundred," ordinals, such as "first" or "fourth," multiplicative numbers, such as "once" or "twice," multipliers, such as "double" or "triple," or distributive numbers, such as "singly," used descriptively herein are explanatory and non-limiting, except as is described herein or as is otherwise clear from context. For example, a "second" element may be performed prior to a "first" element, unless expressly stated, or otherwise clear from context.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:

receiving, at an agentic intermediary, a request from a client device;

determining that the request includes restricted data;

replacing the restricted data with one or more placeholders to generate a sanitized request, wherein replacing the restricted data with the one or more placeholders to generate the sanitized request comprises:

maintaining consistency in placeholder assignments such that multiple occurrences of a same restricted data value are replaced with a same placeholder identifier;

transmitting the sanitized request to an artificial intelligence model for processing;

receiving, from the artificial intelligence model, a response that includes the one or more placeholders;

restoring the restricted data in place of the one or more placeholders in the response to generate a restored response; and transmitting the restored response to the client device.

2. The method of claim 1, further comprising:

creating bidirectional association records in a placeholder mapping data store, wherein each record pairs an original restricted data value with a corresponding placeholder identifier; and encrypting the bidirectional association records before storing them in the placeholder mapping data store.

3. The method of claim 2, further comprising:

deleting the bidirectional association records from the placeholder mapping data store after transmitting the restored response to the client device.

4. The method of claim 1, further comprising:

before replacing the restricted data, evaluating the request against guardrails rules to determine whether the request violates the guardrails rules; and determining that the request does not violate the guardrails rules, wherein replacing the restricted data is performed in response to determining that the request does not violate the guardrails rules.

5. The method of claim 1, further comprising:

after replacing the restricted data and before transmitting the sanitized request to the artificial intelligence model, evaluating the sanitized request against guardrails rules to determine whether the sanitized request violates the guardrails rules; and determining that the sanitized request does not violate the guardrails rules, wherein transmitting the sanitized request to the artificial intelligence model is performed in response to determining that the sanitized request does not violate the guardrails rules.

6. The method of claim 1, further comprising:

validating that placeholders in the response from the artificial intelligence model match the placeholders in the sanitized request; and discarding the response if unexpected placeholders are detected.

7. The method of claim 1, wherein determining that the request includes the restricted data comprises evaluating the request against guardrails rules retrieved from a configuration database.

8. The method of claim 1, wherein the one or more placeholders indicate a category of the restricted data being replaced.

9. A system, comprising:

a memory subsystem; and processing circuitry, the processing circuitry configured to execute instructions stored in the memory subsystem to:

receive, at an agentic intermediary, a request from a client device;

determine that the request includes restricted data;

replace the restricted data with one or more placeholders to generate a sanitized request, wherein to replace the restricted data with the one or more placeholders to generate the sanitized request comprises to:

maintain consistency in placeholder assignments such that multiple occurrences of a same restricted data value are replaced with a same placeholder identifier;

transmit the sanitized request to an artificial intelligence model for processing;

receive, from the artificial intelligence model, a response that includes the one or more placeholders;

restore the restricted data in place of the one or more placeholders in the response to generate a restored response; and transmit the restored response to the client device.

10. The system of claim 9, the processing circuitry further configured to execute instructions in the memory subsystem to:

before replacing the restricted data, evaluate the request against guardrails rules to determine whether the request violates the guardrails rules; and determine that the request does not violate the guardrails rules, wherein replacing the restricted data is performed in response to determining that the request does not violate the guardrails rules.

11. The system of claim 9, the processing circuitry further configured to execute instructions in the memory subsystem to:

determine whether the restricted data can be successfully replaced with placeholders while preserving a logical structure of the request; and block the request.

12. The system of claim 9, wherein, to replace the restricted data with the one or more placeholders to generate the sanitized request, the processing circuitry configured to execute instructions stored in the memory subsystem to:

use a naming convention by placeholder type, wherein the naming convention indicates a category of the restricted data being replaced.

13. The system of claim 9, the processing circuitry further configured to execute instructions in the memory subsystem to:

apply different anonymization strategies based on data type, including redacting numerical identifiers entirely and substituting placeholders for textual identifiers.

14. The system of claim 9, the processing circuitry further configured to execute instructions in the memory subsystem to:

return an error response to the client device based on determination that the restricted data cannot be replaced with placeholders without breaking a logical structure of the request.

15. One or more non-transitory computer-readable storage media comprising instructions that, when executed by one or more processors, perform operations, the operations comprising:

receiving, at an agentic intermediary, a request from a client device;

determining that the request includes restricted data;

replacing the restricted data with one or more placeholders to generate a sanitized request, wherein replacing the restricted data with the one or more placeholders to generate the sanitized request comprises:

maintaining consistency in placeholder assignments such that multiple occurrences of a same restricted data value are replaced with a same placeholder identifier;

transmitting the sanitized request to an artificial intelligence model for processing;

receiving, from the artificial intelligence model, a response that includes the one or more placeholders;

restoring the restricted data in place of the one or more placeholders in the response to generate a restored response; and transmitting the restored response to the client device.

16. The one or more non-transitory computer-readable storage media of claim 15, the operations further comprising:

after replacing the restricted data and before transmitting the sanitized request to the artificial intelligence model, evaluating the sanitized request against guardrails rules to determine whether the sanitized request violates the guardrails rules; and determining that the sanitized request does not violate the guardrails rules, wherein transmitting the sanitized request to the artificial intelligence model is performed in response to determining that the sanitized request does not violate the guardrails rules.

17. The one or more non-transitory computer-readable storage media of claim 15, wherein transmitting the sanitized request comprises appending metadata to indicate that the request has been sanitized; and wherein receiving the response comprises validating the metadata prior to restoring restricted data.

18. The one or more non-transitory computer-readable storage media of claim 15, wherein transmitting the sanitized request to an artificial intelligence model comprises:

selecting the artificial intelligence model from an artificial intelligence models register.

19. The one or more non-transitory computer-readable storage media of claim 18, wherein selecting the artificial intelligence model further comprises:

filtering a plurality of available artificial intelligence models to identify a subset of trusted artificial intelligence models that comply with a predefined security policy; and selecting the artificial intelligence model from the subset of trusted artificial intelligence models.

20. The method of claim 1, wherein transmitting the sanitized request to the artificial intelligence model comprises:

routing the sanitized request exclusively to one or more artificial intelligence models that are designated as approved for processing data associated with a category of the restricted data detected in the request.

* * * * *